(12) United States Patent
Jung et al.

(10) Patent No.: US 10,599,908 B2
(45) Date of Patent: Mar. 24, 2020

(54) APPARATUS FOR REDUCING NOISE INPUT TO FINGERPRINT SENSOR

(71) Applicant: Samsung Electronics Co., Ltd., Gyeonggi-do (KR)

(72) Inventors: Dae Kwang Jung, Gyeonggi-do (KR); Myung Su Kang, Seoul (KR); Jeong Seob Kim, Daegu (KR); Ji Hyun Jung, Gyeonggi-do (KR); Woo Hyek Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/797,585

(22) Filed: Oct. 30, 2017

(65) Prior Publication Data
US 2018/0121703 A1    May 3, 2018

(30) Foreign Application Priority Data
Oct. 28, 2016  (KR) .......................... 10-2016-0142397

(51) Int. Cl.
| G06K 9/00 | (2006.01) |
| G06F 3/041 | (2006.01) |
| G06K 9/40 | (2006.01) |
| G06K 9/58 | (2006.01) |
| G02B 26/00 | (2006.01) |
| G02B 27/28 | (2006.01) |
| G02F 1/163 | (2006.01) |

(52) U.S. Cl.
CPC ......... *G06K 9/00046* (2013.01); *G06F 3/041* (2013.01); *G06K 9/0004* (2013.01); *G06K 9/40* (2013.01); *G06K 9/58* (2013.01); *G02B 26/004* (2013.01); *G02B 27/286* (2013.01); *G02F 1/163* (2013.01)

(58) Field of Classification Search
CPC ................................................. G06K 9/00046
See application file for complete search history.

(56) References Cited

U.S. PATENT DOCUMENTS

| 8,605,960 B2 | 12/2013 | Orsley |
| 8,666,456 B2 | 3/2014 | Liu et al. |
| 8,963,886 B2 | 2/2015 | Wassvik |
| 9,036,240 B2 | 5/2015 | Huang |

(Continued)

FOREIGN PATENT DOCUMENTS

| EP | 3 026 820 | 6/2016 |
| KR | 20000013995 | 3/2000 |

(Continued)

OTHER PUBLICATIONS

European Search Report dated Jan. 3, 2018 issued in counterpart application No. 17198509.6-1507, 9 pages.

*Primary Examiner* — Oneal R Mistry
(74) *Attorney, Agent, or Firm* — The Farrell Law Firm, P.C.

(57) ABSTRACT

Disclosed is an electronic device that includes a cover glass forming an outer surface of the electronic device, a first guide structure disposed below the cover glass and transmitting light polarized in a specified direction, a display panel disposed below the first guide structure and including a plurality of pixels, a second guide structure disposed below the display panel and transmitting light polarized in the specified direction, and a fingerprint sensor disposed below the second guide structure.

19 Claims, 34 Drawing Sheets

(56) References Cited

U.S. PATENT DOCUMENTS

| | | | |
|---|---|---|---|
| 9,710,120 B2 | 7/2017 | Chang et al. | |
| 2004/0252867 A1* | 12/2004 | Lan | G06K 9/0004 |
| | | | 382/124 |
| 2010/0220900 A1 | 9/2010 | Orsley | |
| 2013/0095885 A1 | 4/2013 | Liu et al. | |
| 2013/0127790 A1 | 5/2013 | Wassvik | |
| 2013/0321345 A1 | 12/2013 | Burns | |
| 2013/0321432 A1 | 12/2013 | Burns | |
| 2014/0126040 A1 | 5/2014 | Huang | |
| 2015/0138161 A1 | 5/2015 | Wassvik | |
| 2015/0310251 A1 | 10/2015 | Wyrwas et al. | |
| 2016/0165027 A1 | 6/2016 | Hahn et al. | |
| 2016/0171281 A1* | 6/2016 | Park | G06F 1/1643 |
| | | | 382/124 |
| 2016/0266695 A1* | 9/2016 | Bae | G06F 1/1643 |
| 2016/0313865 A1 | 10/2016 | Chang et al. | |
| 2017/0091506 A1* | 3/2017 | Sinha | G06F 1/1643 |
| 2017/0220844 A1* | 8/2017 | Jones | G06K 9/0053 |
| 2017/0351364 A1* | 12/2017 | Kim | G06F 3/0416 |
| 2018/0046281 A1* | 2/2018 | Pi | A61B 5/02416 |
| 2018/0096186 A1* | 4/2018 | Mienko | G06K 9/00013 |
| 2018/0196985 A1* | 7/2018 | Ling | G06K 9/0004 |

FOREIGN PATENT DOCUMENTS

| | | |
|---|---|---|
| KR | 1020100099062 | 9/2010 |
| KR | 1020150131944 | 11/2015 |

* cited by examiner

APPARATUS FOR REDUCING NOISE INPUT TO FINGERPRINT SENSOR

PRIORITY

This application claims priority under 35 U.S.C. § 119(a) to Korean Patent Application Serial No. 10-2016-0142397, which was filed in the Korean Intellectual Property Office on Oct. 28, 2016, the entire content of which is incorporated herein by reference.

BACKGROUND

1. Field of the Disclosure

The present disclosure relates to a technology for reducing noise from a fingerprint sensor.

2. Description of the Related Art

With the development of technology for recognizing biometric information, electronic devices that include a biometric sensor, such as a fingerprint sensor, an iris sensor, or the like, have become widely used. An electronic device may recognize a user's biometric information by using a biometric sensor and may store the recognized biometric information. The biometric information from the electronic device may be used by the user for such things as to unlock a screen, and to perform financial transactions (e.g., account transfer, electronic payment, and the like).

A fingerprint sensor may set a point at which a ridge splits or terminates as a minutia point and may acquire the distribution and number of minutia points from a fingerprint. The fingerprint sensor may compare the distribution and number of newly recognized minutia points with the distribution and number of minutia points stored in memory to determine whether the fingerprints match each other.

The above described fingerprint sensor may be disposed below a home button of an electronic device. In the case where the fingerprint sensor is disposed below the home button, the home button is attached to an outer surface of the electronic device, and thus there may be a limitation in configuring the outer surface of the electronic device. For example, a full front screen type electronic device, the front side which is all used for a display, may have no space for a home button on the front side. Accordingly, it is required to dispose a fingerprint sensor below a display to acquire a user's fingerprint information.

In the case where a fingerprint sensor is disposed below a display, noise from other sources (e.g., light directly input to the fingerprint sensor from the display) may be introduced into the fingerprint sensor. The noise may decrease the fingerprint recognition rate of the fingerprint sensor.

SUMMARY

Aspects of the present disclosure address at least the above mentioned problems and/or disadvantages and provide at least the advantages described below. Accordingly, an aspect of the present disclosure provides an electronic device for solving the above mentioned problems and disadvantages.

In accordance with an aspect of the present disclosure, an electronic device includes a cover glass forming an outer surface of the electronic device; a first guide structure disposed below the cover glass and transmitting light polarized in a specified direction; a display panel disposed below the first guide structure and including a plurality of pixels; a second guide structure disposed below the display panel and transmitting light polarized in the specified direction; and a fingerprint sensor disposed below the second guide structure.

In accordance with another aspect of the present disclosure, an electronic device includes a cover glass forming an outer surface of the electronic device; a first guide structure disposed below the cover glass and transmitting light polarized in a specified direction; and a display panel disposed below the first guide structure and including a plurality of pixels. The display panel includes a second guide structure transmitting light polarized in the specified direction and a pixel layer disposed below the second guide structure and including the plurality of pixels. Each of the plurality of pixels may include a plurality of sub-pixels and a fingerprint sensor.

In accordance with another aspect of the present disclosure, an electronic device includes a cover glass forming an outer surface of the electronic device; a first guide structure disposed below the cover glass and transmitting light polarized in a specified direction; a display panel disposed below the first guide structure and including a plurality of pixels and a second guide structure transmitting light polarized in the specified direction; and a fingerprint sensor disposed below the display panel.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers may be used to depict the same or similar elements, features, and structures.

DETAILED DESCRIPTION

Figure 1:
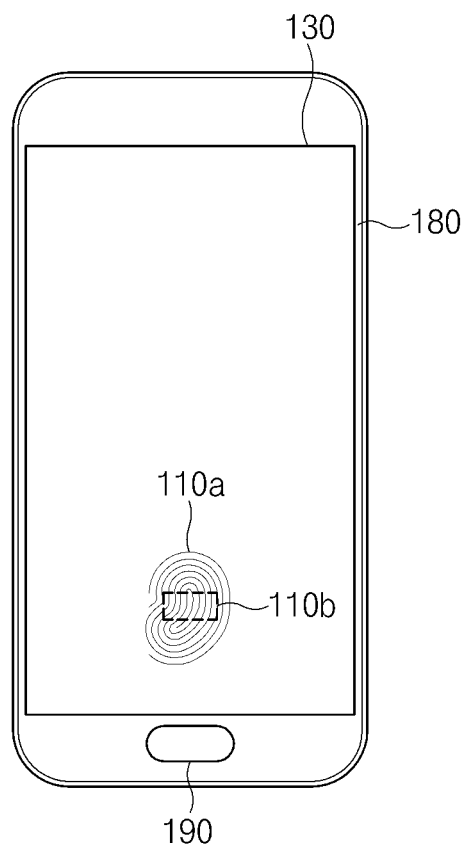
FIG. 1 illustrates an electronic device according to an embodiment of the present disclosure.

Hereinafter, various embodiments of the present disclosure will be described with reference to accompanying drawings. Accordingly, those of ordinary skill in the art will recognize that modifications, equivalents, and/or alternatives of the various embodiments of the present disclosure described herein can be made without departing from the scope and spirit of the present disclosure. In the present disclosure, the expressions "have", "may have", "include" and "comprise", or "may include" and "may comprise" indicate the existence of corresponding features (e.g., elements such as numeric values, functions, operations, or components) but do not exclude the presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms "first", "second", and the like used in the present disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in the present disclosure may be used interchangeably with "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

Terms used in this disclosure are used to describe specific embodiments of the present disclosure and are not intended to limit the scope of another embodiments of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal fashion unless expressly so defined in various embodiments of the present disclosure. In some cases, even if terms are terms which are defined in this disclosure, they may not be interpreted to exclude embodiments of the present disclosure.

An electronic device may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. The wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

The electronic device may be a home appliance. The home appliances may include at least one of televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync", Apple TV™, or Google TV"), game consoles (e.g., Xbox™ or PlayStation™), electronic dictionaries, electronic keys, camcorders, electronic picture frames, and the like.

An electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), point of sales (POSs) devices, or Internet of things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic device may include at least one of parts of furniture or buildings/structures, electronic boards, electronic signature receiving devices, projectors, or various measuring instruments (e.g., water meters, electricity meters, gas meters, or wave meters, and the like). The electronic device may be one of the above described devices or a combination thereof. An electronic device may be a flexible electronic device. Furthermore, an electronic device may not be limited to the above described electronic devices and may include other electronic devices and new electronic devices according to the development of new technologies.

In the present disclosure, the term "user" may refer to a person who uses an electronic device or may refer to a device (e.g., an artificial intelligence electronic device) that uses the electronic device.

FIG. 1 illustrates an electronic device.

Referring to FIG. 1, an electronic device 100 may include a display 130, a bezel 180, and a button 190.

The display 130 may display a fingerprint sensing area 110b. The fingerprint sensing area 110b may be directly displayed on the display 130, or may not be displayed on the display 130. The fingerprint sensing area 110b may be displayed in a region corresponding to a fingerprint sensor 171 disposed below the display 130. The fingerprint sensing area 110b may have an indication that induces a user to touch the display 130 with his/her finger. If the fingerprint sensing area 110b is displayed on the display 130, the user may touch the fingerprint sensing area 110b with his/her finger. The fingerprint sensor 171 may acquire fingerprint information through an overlapping area between the fingerprint sensing area 110b and a contact area 110a in which the user's finger makes contact with the display 130.

The bezel 180 may be disposed on a side surface of the display 130 and may be coupled with a housing. The bezel 180 may include a non-metal area and may be implemented with a plastic injection molded material. A receiver, a proximity sensor, a camera, and the like may be disposed in a region of the bezel 180.

The button 190 may be disposed in a region of the bezel 180 to control the electronic device 100. For example, the button 190 may be referred to as a home button, a back button, or a menu button. In the case where the button 190 is a home button 190, a home screen may be output on the display 130 if the user presses the button 190.

While FIG. 1 shows that the electronic device 100 includes the display 130, the bezel 180, and the button 190, the electronic device 100 may be a full front screen type electronic device. In the case where the electronic device 100 is a full front screen type electronic device, the display 130, not including the bezel 180 and the button 190, may be disposed on the front side of the electronic device 100.

Figure 2:
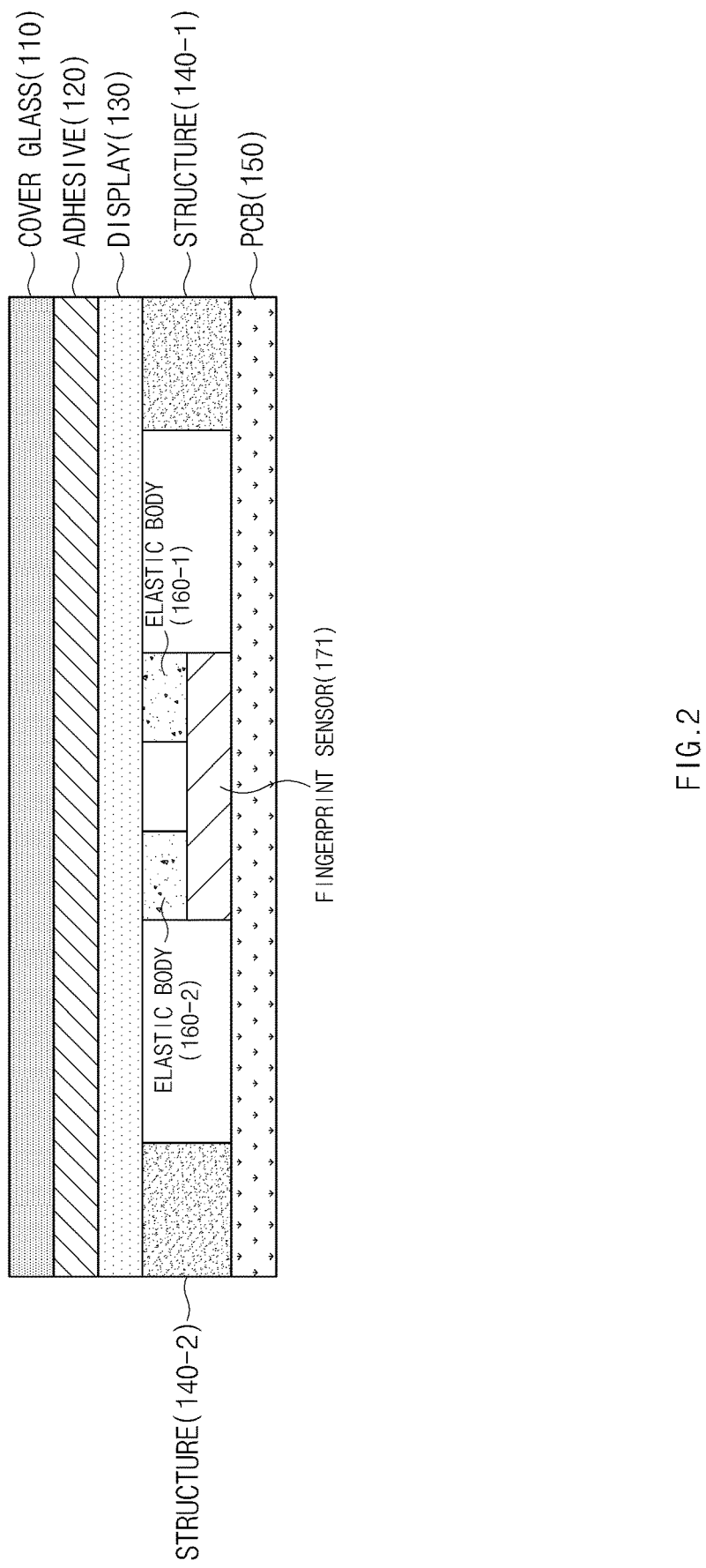
FIG. 2 is a sectional view of the electronic device, according to an embodiment of the present disclosure.

FIG. 2 is a sectional view of the electronic device 100.

Referring to FIG. 2, the electronic device 100 may include a cover glass 110, an adhesive 120, the display 130, structures 140-1 and 140-2, a printed circuit board (PCB) 150, elastic bodies 160-1 and 160-2, and the fingerprint sensor 171.

The cover glass 110 may transmit light generated by the display 130. Furthermore, a user may perform a touch event (including contact using an electronic pen) by touching the cover glass 110 with a part of his/her body (e.g., a finger). The cover glass 110 may be formed from reinforced glass, reinforced plastic, a flexible polymer material, or the like to form an outer surface of the electronic device 100. The cover glass 110 may be referred to as a glass window.

The adhesive 120 may be used to stick the cover glass 110 and the display 130 together. The adhesive 120 may include a transparent film to transmit light generated by the display 130. The adhesive 120 may be referred to as an optical clear adhesive film.

The structures 140-1 and 140-2 may be elements for ensuring space in which the fingerprint sensor 171 is mounted. The structures 140-1 and 140-2 may be referred to as brackets. The structures 140-1 and 140-2 may be formed from a magnesium alloy and may be coupled with the display 130 and/or the PCB 150 to physically support the display 130 and/or the PCB 150.

The PCB 150 may be disposed below the structures 140-1 and 140-2 and may be electrically connected with the display 130 and/or the fingerprint sensor 171 through a connector or interconnection wiring. The PCB 150 may be implemented with a rigid printed circuit board (rigid PCB). Various types of electronic components, elements, printed circuits, and the like of the electronic device 100 may be mounted or arranged on the PCB 150.

The elastic bodies 160-1 and 160-2 may be disposed between the fingerprint sensor 171 and the display 130 to absorb a shock between the fingerprint sensor 171 and the display 130. The elastic bodies 160-1 and 160-2 may be formed of sponge, rubber, or the like. The elastic bodies 160-1 and 160-2 may prevent foreign substances from infiltrating into the fingerprint sensor 171.

The fingerprint sensor 171 may be disposed between the display 130 and the PCB 150 to acquire fingerprint information about a finger that makes contact with the cover glass 110. While FIG. 2 shows that the fingerprint sensor 171 is disposed between the display 130 and the PCB 150, the fingerprint sensor 171 may be disposed inside the display 130 or may be disposed between the cover glass 110 and the display 130.

The fingerprint sensor 171 may be smaller in size than the display 130, or may be equal to the display 130 in size. In the case where the fingerprint sensor 171 has the same size as the display 130, the fingerprint sensor 171 may acquire fingerprint information through the entire area of the display 130. One or more fingerprint sensors 171 may be provided. In the case where two or more fingerprint sensors 171 are provided, fingerprint information may be acquired through a plurality of areas.

Figure 3:
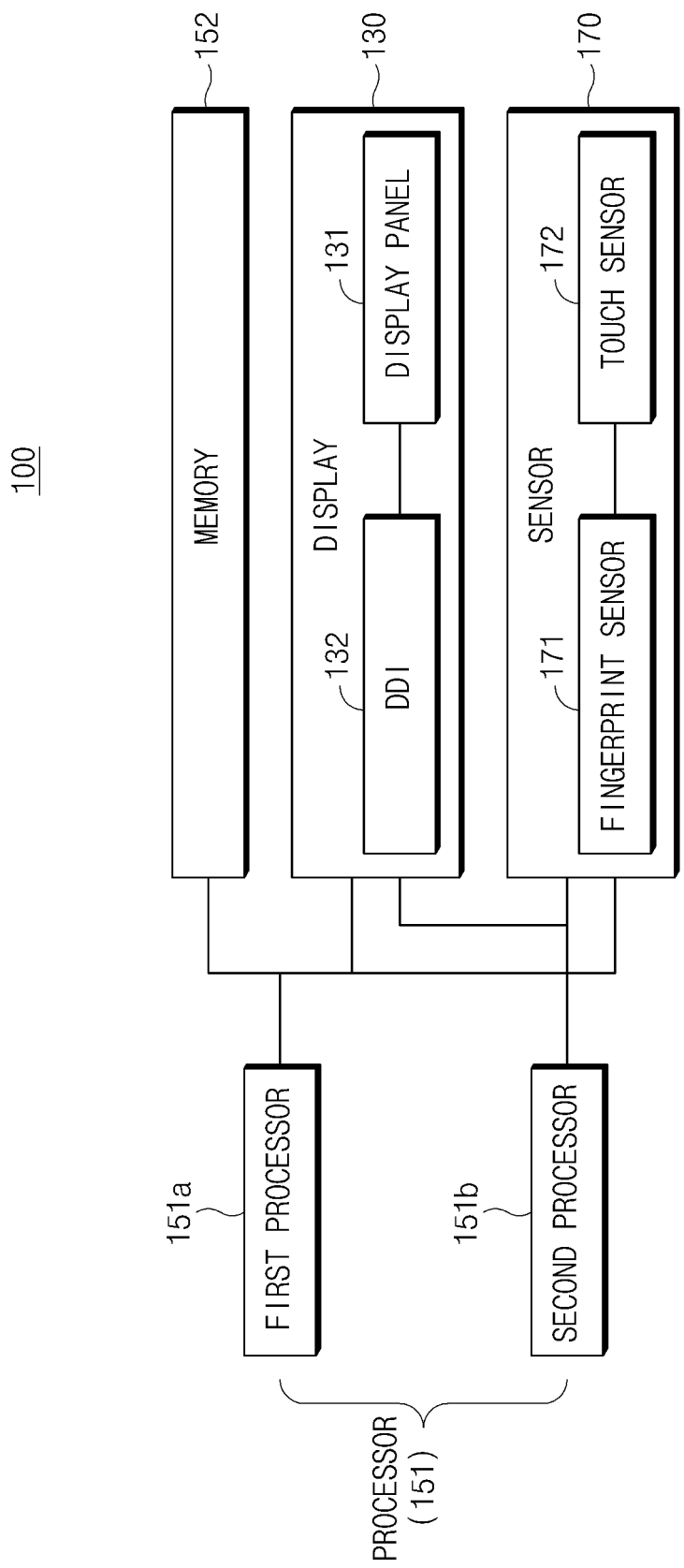
FIG. 3 is a block diagram of the electronic device, according to an embodiment of the present disclosure.

FIG. 3 is a block diagram of the electronic device 100.

Referring to FIG. 3, the electronic device 100 may include a processor 151, a memory 152, the display 130, and a sensor 170.

A first processor 151a may control the connected memory 152, the display 130, and the sensor 170. For example, the first processor 151a may turn on/off the display 130 by using instructions stored in the memory 152. A second processor 151b may control the display 130 and the sensor 170 in the case where the electronic device 100 operates in a low-power mode. For example, if a user touches the display 130 with a part of his/her body (e.g., a finger), the second processor 151b may acquire fingerprint information through the fingerprint sensor 171. If the user touches the display 130 with an object (e.g., a touch pen), the second processor 151b may sense the position of the object through a touch sensor 172.

The memory 152 may store instructions for controlling the display 130, the sensor 170, and the like. The memory 152 may include a normal area for storing applications and a secure area for storing security sensitive information (e.g., information acquired by the fingerprint sensor 171).

The display 130 may include a display driver IC (DDI) 132 and a display panel 131. The display panel 131 may include a plurality of pixels. The DDI 132 may electrically connect the processor 151 and the display panel 131 together. The DDI 132 may control at least some of the plurality of pixels included in the display panel 131 to display an image.

The sensor 170 may include the fingerprint sensor 171 and/or the touch sensor 172. The fingerprint sensor 171 may acquire fingerprint information from the user's finger that makes contact with the cover glass 110. If light emitted from the display 130 is reflected from the finger, the fingerprint sensor 171 may acquire fingerprint information by using the reflected light. The fingerprint sensor 171 may be of an optical type, an ultrasonic type, or a capacitive type, and the type of fingerprint sensor 171 is not limited thereto. The touch sensor 172 may sense the position where the user touches the display 130.

Figure 4:
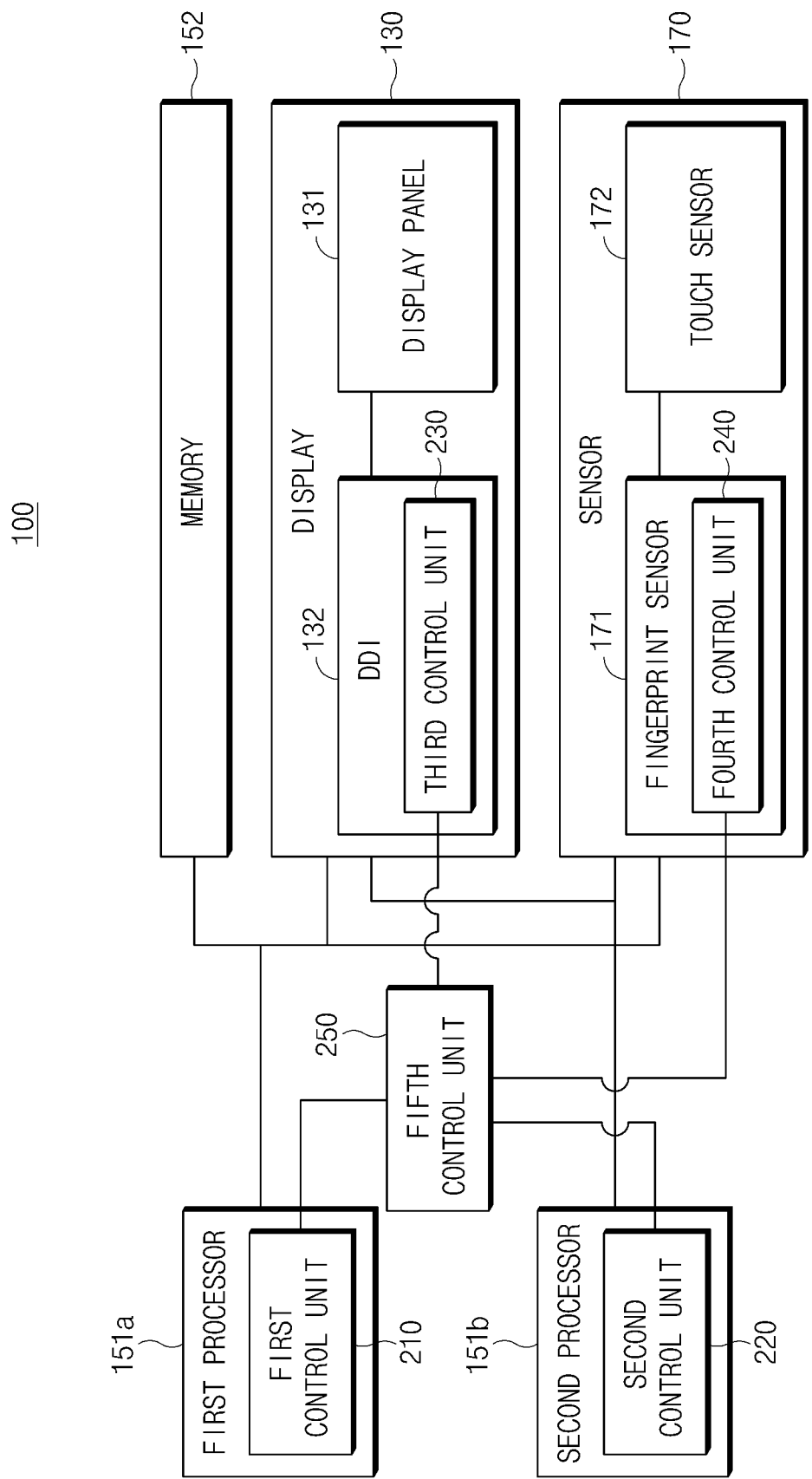
FIG. 4 is a block diagram of the electronic device including a control unit, according to an embodiment of the present disclosure.

FIG. 4 is a block diagram of the electronic device 100 including a control unit.

Referring to FIG. 4, the electronic device 100 may include first to fifth control units 210 to 250.

The electronic device 100 may control the first processor 151a by using the first control unit 210. The electronic device 100 may control the memory 152, the display 130, and the sensor 170 by using the first control unit 210. The electronic device 100 may control the second processor 151b by using the second control unit 220. The electronic device 100 may control the display 130 and the sensor 170 by using the second control unit 220 in the case where the electronic device 100 operates in a low-power mode.

The electronic device 100 may control the DDI 132 by using the third control unit 230. The electronic device 100 may control the display panel 131 connected with the DDI 132, by using the third control unit 230. The electronic device 100 may control the fingerprint sensor 171 by using the fourth control unit 240. The electronic device 100 may acquire fingerprint information by using the fourth control unit 240. The electronic device 100 may control the first to fourth control units 210 to 240 by using the fifth control unit 250.

The electronic device 100 may select one of the first to fifth control units 210 to 250 as a main control unit, and the selected control unit may control the other control units. The electronic device 100 may control modules included in the electronic device 100 by using one of the first to fifth control units 210 to 250. For example, the electronic device 100 may control the second processor 151b, the memory 152, the display 130, and the sensor 170 by using the first control unit 210.

The electronic device 100 may simultaneously control the display 130 and the sensor 170 by using one of the first to fifth control units 210 to 250. For example, in the case where the fingerprint sensor 171 is an optical fingerprint sensor 171, the electronic device 100 may use the display 130 as a light source through the first control unit 210. If the display 130 emits light, the electronic device 100 may acquire fingerprint information by controlling the fingerprint sensor 171 through the first control unit 210.

Figure 5:
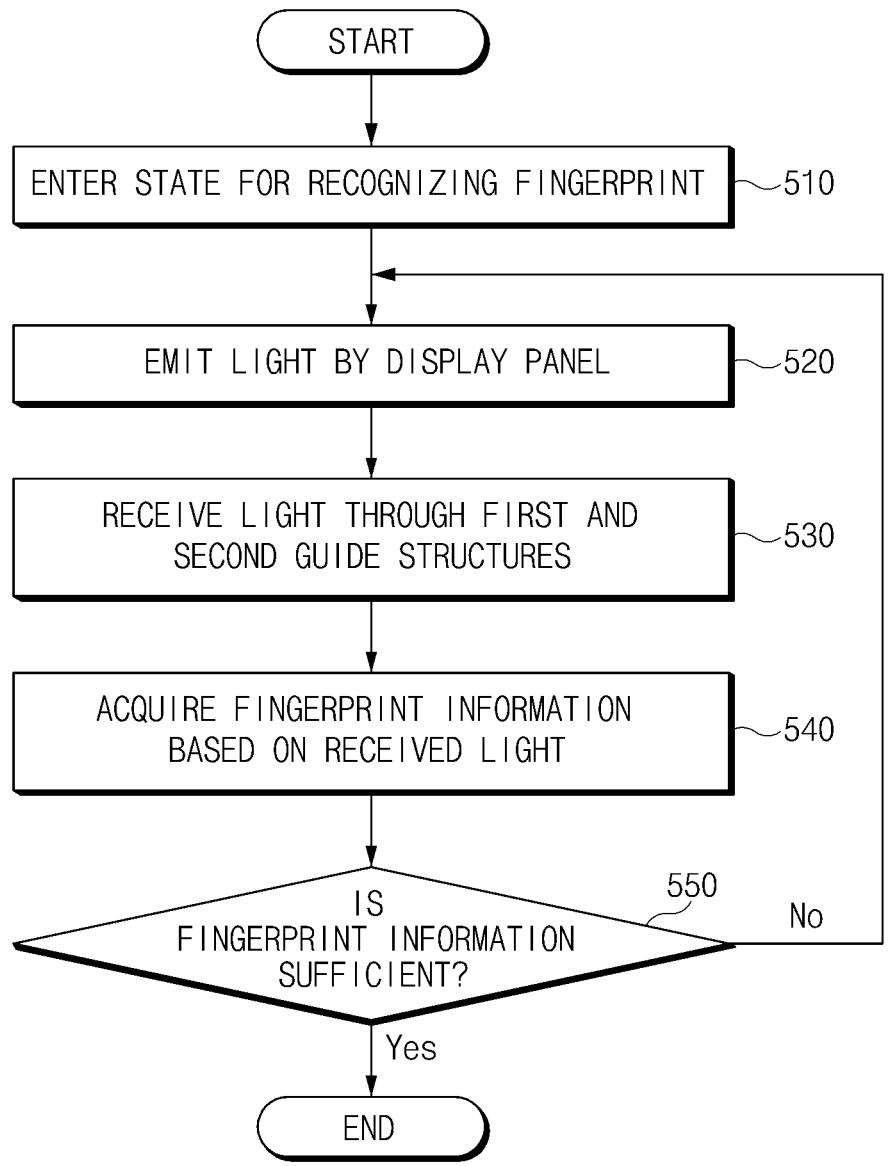
FIG. 5 is a flowchart illustrating an operation of the electronic device, according to an embodiment of the present disclosure.
Figure 6:
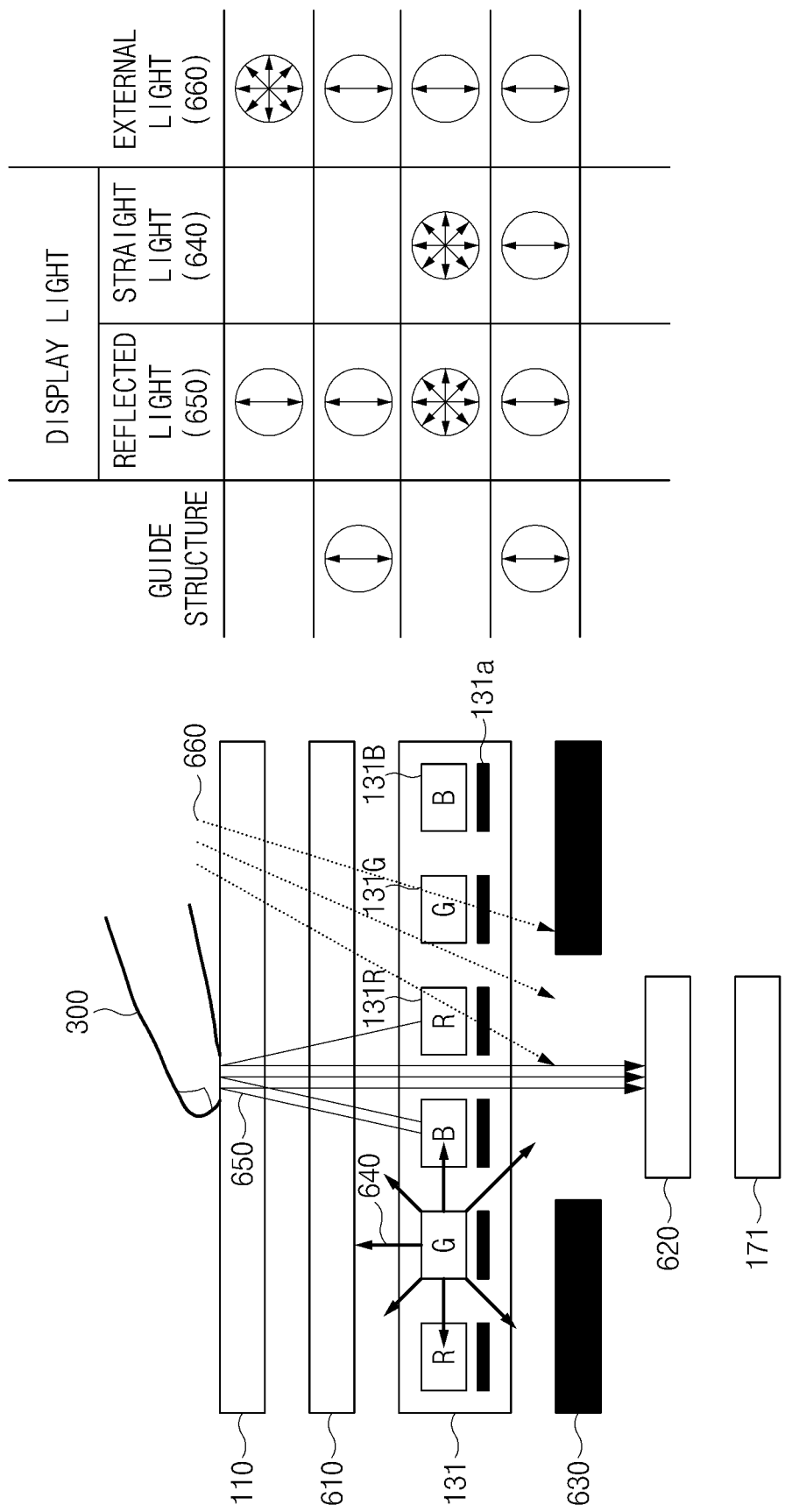
FIG. 6 is a sectional view of the electronic device having a guide structure disposed below a display panel thereof, according to an embodiment of the present disclosure.

FIG. 5 is a flowchart illustrating an operation of the electronic device 100. FIG. 6 is a sectional view of the electronic device 100 having a guide structure disposed below the display panel 131. In the present disclosure, the contents described above with reference to FIGS. 1 to 4 may also be identically applied to elements having the same reference numerals as the elements of the electronic device 100 that have been described with reference to FIGS. 1 to 4.

Referring to FIGS. 5 and 6, in step 510, the electronic device 100 may enter a state for recognizing a fingerprint. For example, the state for recognizing a fingerprint may be a state for storing a recognized fingerprint in the memory 152. The state for recognizing a fingerprint may be a state for reading a fingerprint and comparing the read fingerprint information with fingerprint information stored in the memory 152 to unlock a lock screen.

If the electronic device 100 enters the state for recognizing a fingerprint, in step 520, the display panel 131 may emit light. The light emitted from the display panel 131 may radiate toward the cover glass 110 and may radiate toward the fingerprint sensor 171 disposed below the display panel 131. The light radiating toward the cover glass 110 may be reflected by a user's finger 300 making contact with a surface of the cover glass 110 and may pass through the cover glass 110 to escape from the electronic device 100. The light radiating toward the fingerprint sensor 171 may be directly input to the fingerprint sensor 171 and may be absorbed by an opaque member 630, opaque electrodes 131a, and the like.

If the display panel 131 emits light, the fingerprint sensor 171 may receive the light through a first guide structure 610 and a second guide structure 620 in step 530. For example, the fingerprint sensor 171 may receive light having passed through the first and second guide structures 610 and 620 after reflected by the finger 300, from the light emitted from the display panel 131. If the light is received through the first and second guide structures 610 and 620, the fingerprint sensor 171 may acquire fingerprint information based on the received light in step 540. The fingerprint information may be an image of the fingerprint, the positions of minutia points, the number of minutia points, distribution of minutia points, or the like. In the present disclosure, the guide structures may be referred to as polarizing plates.

In step 550, the electronic device 100 may determine whether the acquired fingerprint information is sufficient. For example, the electronic device 100 may determine whether an acquired fingerprint image is greater than or equal to an area set in advance. If the acquired fingerprint image is greater than or equal to the area set in advance, the electronic device 100 may store, in the memory 152, the positions of minutia points, the distribution of minutia points, and the like on the basis of the acquired fingerprint image. If the acquired fingerprint image is smaller than the area set in advance, the electronic device 100 may allow the display 130 to emit light and the fingerprint sensor 171 to receive the light through the first and second guide structures 610 and 620 to acquire an additional image.

Referring to FIG. 6, the electronic device 100 may include the first guide structure 610, the second guide structure 620, and the opaque member 630.

The first guide structure 610 may be disposed below the cover glass 110 and may transmit light polarized in a specified direction. The specified direction may be a direction perpendicular to the fingerprint sensor 171. For example, the first guide structure 610 may transmit light polarized in the specified direction, from the light 650 that has been reflected by the finger 300 after emitted from the display 130. The first guide structure 610 may transmit light polarized in the specified direction, from external light 660 (e.g., sunlight) incident on the electronic device 100 from the outside.

The display panel 131 may be disposed below the first guide structure 610 and may include a plurality of pixels. The pixels may include a plurality of sub-pixels and the opaque electrodes 131a. For example, the pixels may include red sub-pixels 131R that emits red light, green sub-pixels 131G that emits green light, blue sub-pixels 131B that emits blue light, and the opaque electrodes 131a disposed below the respective sub-pixels. The opaque electrodes 131a may apply a current to the sub-pixels to allow the sub-pixels to emit light. The opaque electrodes 131a may block out light radiating downward from the sub-pixels.

The second guide structure 620 may be disposed below the display panel 131 and may transmit light polarized in the specified direction. For example, the second guide structure 620 may transmit light polarized in the specified direction, from the reflected light 650 and the external light 660 that have passed through the first guide structure 610. The second guide structure 620 may also transmit light polarized in the specified direction, from straight light 640 emitted from the display panel 131. The second guide structure 620 may have the same guide structure as the first guide structure 610, or may be a guide structure for polarizing light in the same direction as the first guide structure 610.

Since the second guide structure 620 is disposed below the display panel 131, it is possible to reduce the external light 660 and/or the straight light 640 that is input to the fingerprint sensor 171, thereby decreasing noise and thus increasing a fingerprint recognition rate of the fingerprint sensor 171.

The opaque member 630 may be disposed below the display panel 131. The opaque member 630 may include an opening in an area that corresponds to the fingerprint sensor 171, and the reflected light 650 may be input to the fingerprint sensor 171 through the opening. The opaque member 630 may block out light radiating downward from the display panel 131 to increase visibility.

The opaque member 630 may be a protective layer disposed below the display panel 131, and the second guide structure 620 may be disposed in the protective layer. If the second guide structure 620 is disposed in the protective layer, the separation distance between the cover glass 110 and the fingerprint sensor 171 may be decreased, which results in a decrease in the sensing distance of the fingerprint sensor 171. Since the amount and intensity of the reflected light 650 input to the fingerprint sensor 171 increase with the decreasing sensing distance, the fingerprint sensor 171 may acquire a high-resolution fingerprint image.

The protective layer may include at least one of an embo, a sponge, and a copper (Cu) graphite coating layer. The embo may be a layer comprising a bumpy pattern. For example, the protective layer may include an embossed pattern, a sponge, or the like to absorb a shock between the display 130 and the fingerprint sensor 171, thereby protecting the display 130 and the fingerprint sensor 171. The protective layer may be formed of copper graphite to prevent heat generated in the display 130 from being transferred to the fingerprint sensor 171. Since heat transferred to the fingerprint sensor 171 causes noise, the protective layer may block out heat transfer to the fingerprint sensor 171 to increase a fingerprint recognition rate of the fingerprint sensor 171.

Figure 7:
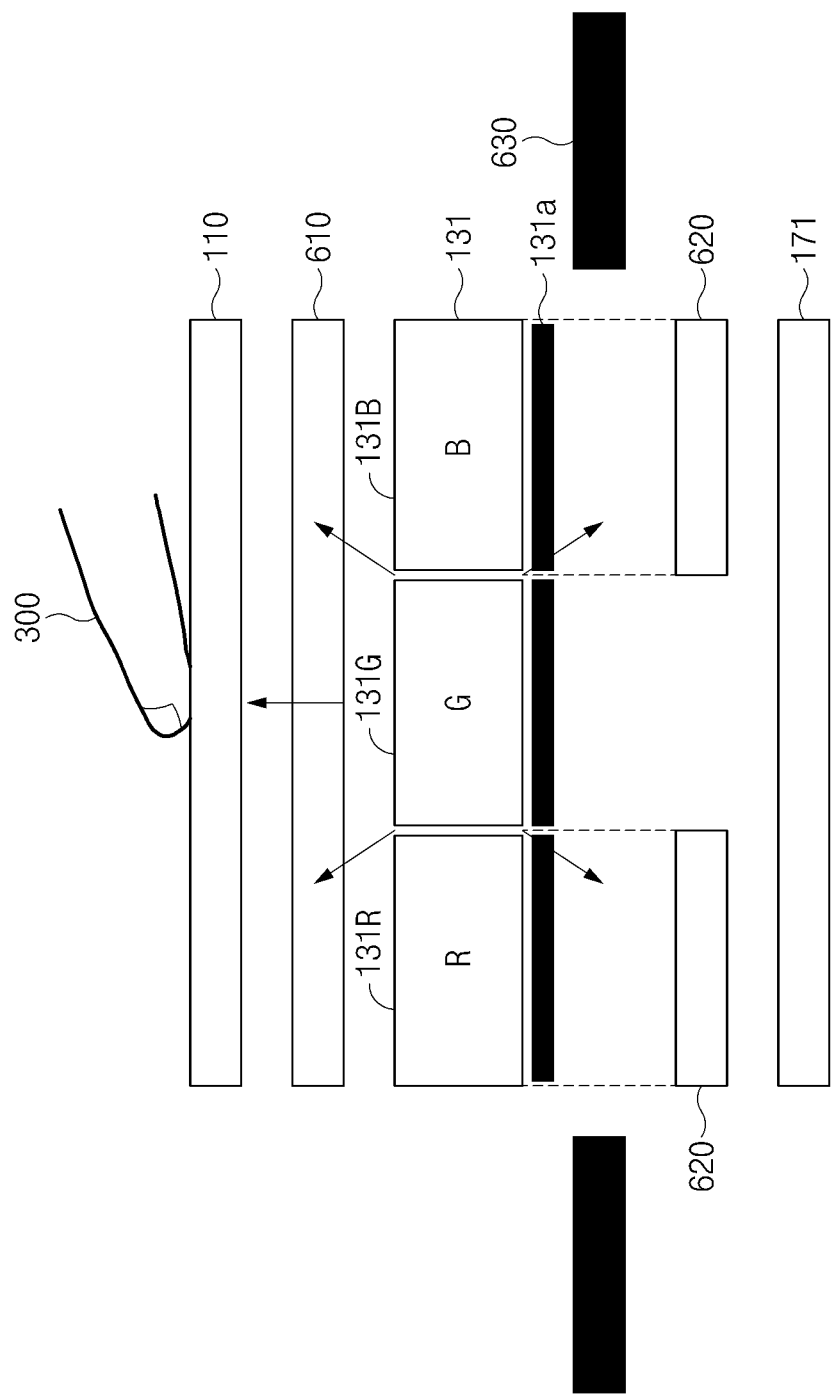
FIG. 7 is a sectional view of the electronic device in which light emitted from one of sub-pixels is input to a fingerprint sensor through a second guide structure, according to an embodiment of the present disclosure.

FIG. 7 is a sectional view of the electronic device 100 in which light emitted from one of the sub-pixels is input to the fingerprint sensor 171 through the second guide structure 620.

Referring to FIG. 7, the fingerprint sensor 171 may acquire fingerprint information by using only light emitted from some sub-pixels. For example, the sub-pixels may include a first sub-pixel, a second sub-pixel, and the opaque electrodes 131a disposed below the first and second sub-pixels, respectively, and the second guide structure 620 may be disposed below the first sub-pixel.

The first sub-pixel may be a sub-pixel that is turned off, from the sub-pixels. For example, in FIG. 7, the first sub-pixel may be the red sub-pixel 131R or the blue sub-pixel 131B. The second sub-pixel may be a sub-pixel that is turned on, from the sub-pixels. In FIG. 7, the second sub-pixel may be the green sub-pixel 131G. While it is shown in FIG. 7 that the first sub-pixel is the red sub-pixel 131R or the blue sub-pixel 131B and the second sub-pixel is the green sub-pixel 131G, the first and second sub-pixels are not limited thereto.

If the second sub-pixel is turned on, light emitted from the second sub-pixel may radiate toward the cover glass 110 and may be reflected from the finger 300, or may radiate toward the second guide structure 620. Furthermore, a portion of the light emitted from the second sub-pixel may be absorbed by the opaque electrodes 131a. The fingerprint sensor 171 may acquire fingerprint information by using the light emitted from the second sub-pixel. For example, if the first sub-pixel is turned off and the second sub-pixel is turned on, the fingerprint sensor 171 may acquire a user's fingerprint information by using the reflected light 650 having passed through the first and second guide structures 610 and 620 after emitted from the second sub-pixel.

Since the first sub-pixel is turned off when the second sub-pixel is turned on, the first sub-pixel may not emit light. If the first sub-pixel is turned on to emit light, the light may be directly input to the fingerprint sensor 171. Accordingly, the light emitted from the first sub-pixel may cause noise in the fingerprint sensor 171.

The electronic device 100 may turn on sub-pixels (e.g., the first sub-pixel) disposed over the second guide structure 620. For example, if the first sub-pixel is turned on, light emitted from the first sub-pixel may radiate toward the cover glass 110 and may be reflected from the finger 300, or may radiate toward the second guide structure 620. Furthermore, a portion of the light emitted from the first sub-pixel may be absorbed by the opaque electrodes 131a. The fingerprint sensor 171 may acquire fingerprint information by using the light emitted from the first sub-pixel. For example, if the first sub-pixel is turned on and the second sub-pixel is turned off, the fingerprint sensor 171 may acquire the user's fingerprint information by using the reflected light 650 having passed through the first and second guide structures 610 and 620 after emitted from the first sub-pixel. Since the second sub-pixel is turned off when the first sub-pixel is turned on, the second sub-pixel may not emit light. If the second sub-pixel emits light, the light may be input to the fingerprint sensor 171. Accordingly, the light emitted from the second sub-pixel may cause noise.

Noise (e.g., straight light emitted from a turned-off sub-pixel) may be reduced by using only light emitted from a turned on sub-pixel.

Figure 8A:
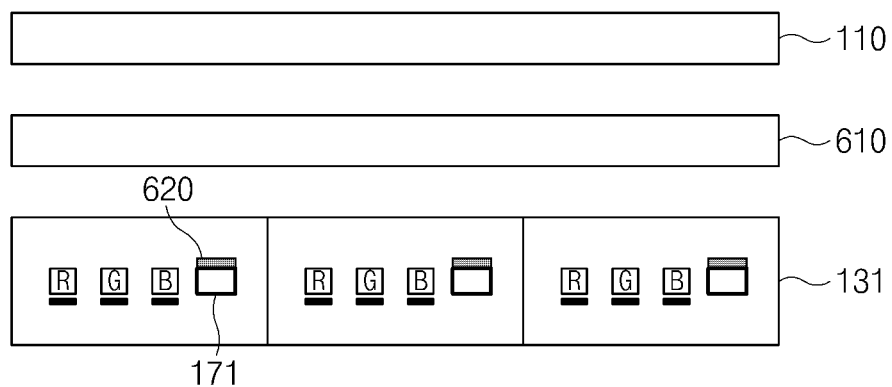
FIG. 8A is a sectional view of the electronic device in which the fingerprint sensor is disposed inside the display panel and the guide structure is disposed over the fingerprint sensor, according to an embodiment of the present disclosure.
Figure 8B:
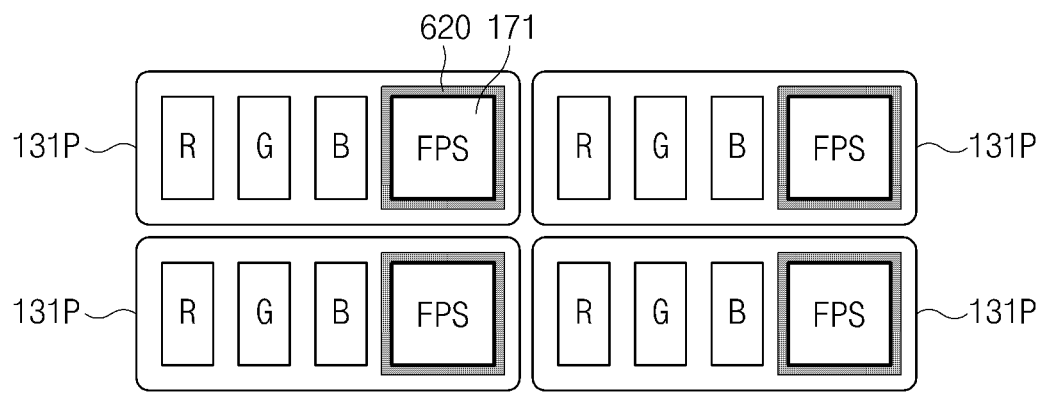
FIG. 8B is a view of the electronic device in which the fingerprint sensor is disposed inside the display panel and the guide structure is disposed over the fingerprint sensor, according to an embodiment of the present disclosure.

FIG. 8A is a sectional view of the electronic device 100 in which the fingerprint sensor 171 is disposed inside the display panel 131 and a guide structure is disposed over the fingerprint sensor 171. FIG. 8B is a view of the electronic device 100 in which the fingerprint sensor 171 is disposed inside the display panel 131 and a guide structure is disposed over the fingerprint sensor 171. FIG. 8A is a sectional view of the electronic device 100 shown in FIG. 8B.

Figure 9A:
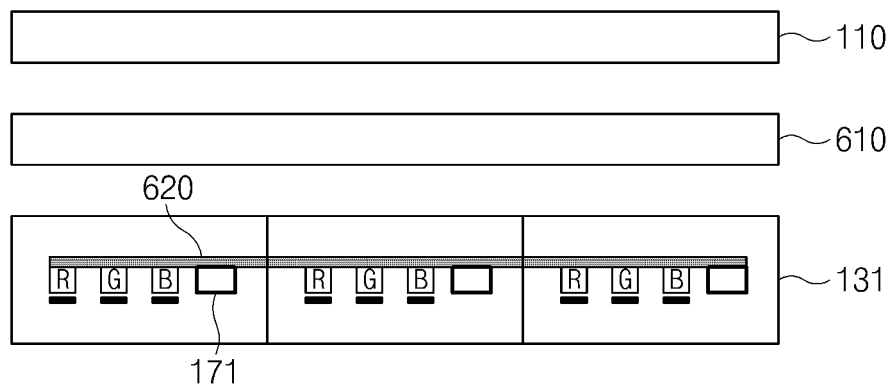
FIG. 9A is a sectional view of the electronic device in which a plurality of pixels and the fingerprint sensor are arranged inside the display panel and the guide structure is disposed over the plurality of pixels and the fingerprint sensor, according to an embodiment of the present disclosure.
Figure 9B:
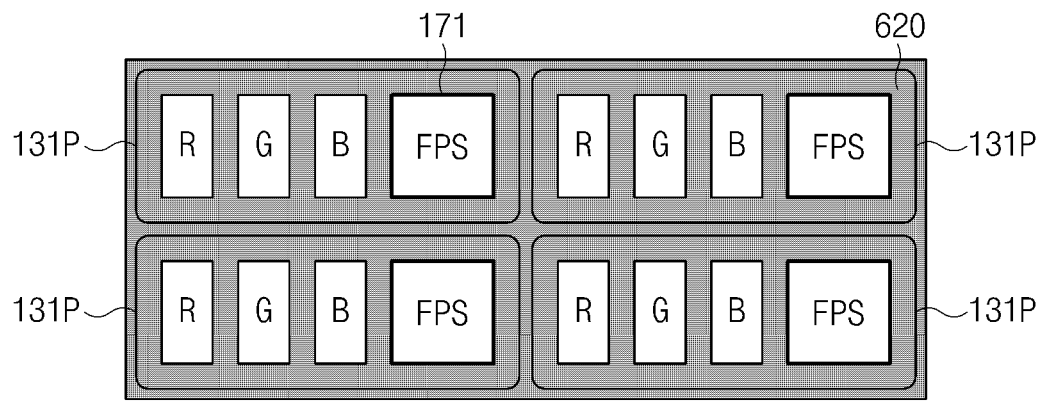
FIG. 9B is a view of the electronic device in which a plurality of pixels and the fingerprint sensor are arranged inside the display panel and the guide structure is disposed over the plurality of pixels and the fingerprint sensor, according to an embodiment of the present disclosure.

FIG. 9A is a sectional view of the electronic device 100 in which a plurality of pixels and the fingerprint sensor 171 are arranged inside the display panel 131 and a guide structure is disposed over the plurality of pixels and the fingerprint sensor 171. FIG. 9B is a view of the electronic device 100 in which a plurality of pixels and the fingerprint sensor 171 are arranged inside the display panel 131 and a guide structure is disposed over the plurality of pixels and the fingerprint sensor 171. FIG. 9A is a sectional view of the electronic device 100 shown in FIG. 9B.

Referring to FIGS. 8A to 9B, the electronic device 100 may include the cover glass 110, the first guide structure 610, and the display panel 131. The cover glass 110 and the first guide structure 610 shown in FIGS. 8A to 9B may be substantially the same as the cover glass 110 and the first guide structure 610 described above with reference to FIGS. 2 to 6. The display panel 131 may include the second guide structure 620, a pixel layer, and the fingerprint sensor 171. The second guide structure 620 may be disposed inside the display panel 131 and may transmit light polarized in a specified direction. The pixel layer may be disposed below the second guide structure 620 and may include a plurality of pixels.

Since the pixel layer and the fingerprint sensor 171 are disposed in the same plane in FIGS. 8A to 9B, the straight light 640, from light emitted from sub-pixels, may not be input to the fingerprint sensor 171. In contrast to the straight light 640, a portion of the reflected light 650, which has been reflected by the finger 300 after emitted from the sub-pixels, may be input to the fingerprint sensor 171 through the first and second guide structures 610 and 620. The fingerprint sensor 171 may acquire fingerprint information based on the reflected light 650 input through the first and second guide structures 610 and 620.

Referring to FIGS. 8A and 8B, a pixel 131P may include a plurality of sub-pixels and the fingerprint sensor 171, and the guide structure 620 may be disposed over the fingerprint sensor 171. The pixel 131P may or may not include the second guide structure 620. Furthermore, the pixel 131P may include any one of the red sub-pixel 131R, the green sub-pixel 131G, and the blue sub-pixel 131B, and the configuration of the pixel 131P is not limited thereto.

Referring to FIGS. 9A and 9B, the second guide structure 620 may be disposed to cover both the pixel layer and the fingerprint sensor 171, unlike in FIGS. 8A and 8B. The structure of the sub-pixels, the fingerprint sensor 171, and the second guide structure 620 is not limited to the embodiments shown in FIGS. 8A to 9B.

Figure 10:
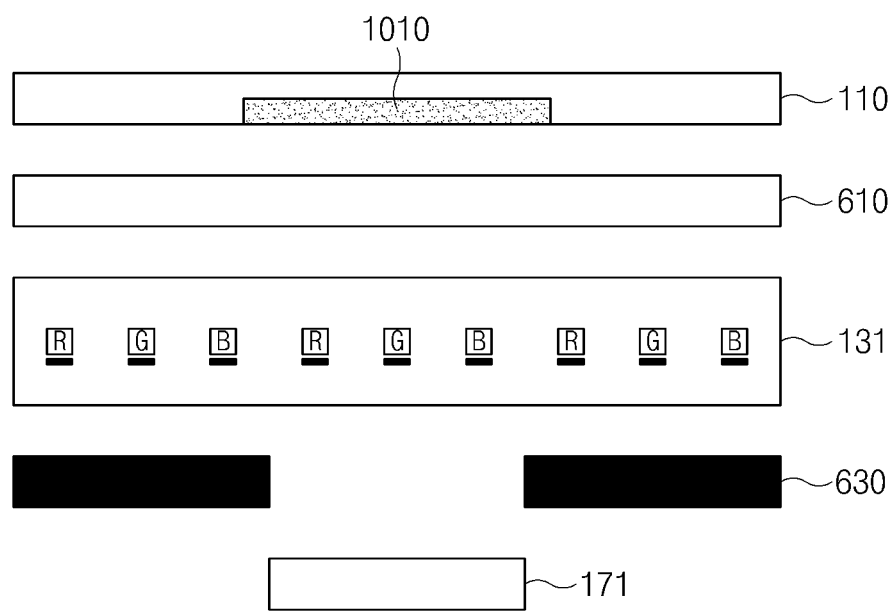
FIG. 10 is a sectional view of the electronic device having an optical guide disposed inside a cover glass thereof, according to an embodiment of the present disclosure.

FIG. 10 is a sectional view of the electronic device 100 having an optical guide 1010 disposed inside the cover glass 110.

Referring to FIG. 10, the electronic device 100 may further include the optical guide 1010. The optical guide 1010 may refract light emitted from pixels to allow the refracted light to pass through the first and second guide structures 610 and 620. At least a portion of the light emitted from the pixels may be refracted while passing through the optical guide 1010. At least a portion of the light refracted while passing through the optical guide 1010 may be reflected by the finger 300 making contact with the cover glass 110. At least a portion of the reflected light may be refracted again while passing through the optical guide 1010 and may be polarized in a specified direction. Since the light polarized in the specified direction passes through the first and second guide structure 610 and 620, the fingerprint sensor 171 may acquire fingerprint information based on the refracted light.

For example, if there is no refraction guide, the straight light 640 described above with reference to FIG. 6 may pass through the cover glass 110 and may escape from the electronic device 100 without being reflected by the finger 300. However, if the optical guide 1010 is present, the straight light 640 may be reflected by the finger 300 while passing through the optical guide 1010 and may be polarized in the specified direction while passing through the optical guide 1010 again. If the straight light 640 is polarized in the specified direction, the fingerprint sensor 171 may acquire fingerprint information by using the straight light 640. The amount of light reflected from a fingerprint may be increased by using the optical guide 1010, thereby enhancing a fingerprint recognition rate.

While FIG. 10 shows that the optical guide 1010 is disposed inside the cover glass 110, the optical guide 1010 may be disposed on a surface of the cover glass 110, or may be disposed inside the display 130. As long as the optical guide 1010 is disposed over the pixel layer and the fingerprint sensor 171, the position of the optical guide 1010 is within the scope of the present disclosure.

Figure 11A:
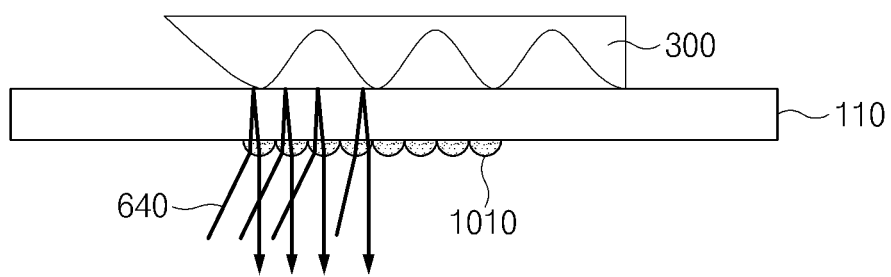
FIG. 11A is a sectional view of the cover glass and the optical guide having the same refractive index as the cover glass, according to an embodiment of the present disclosure.
Figure 11B:
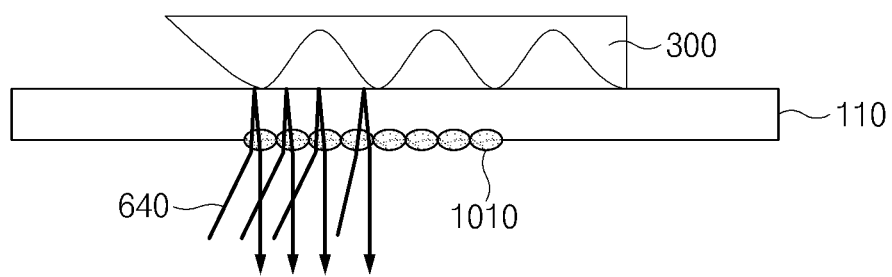
FIG. 11B is a sectional view of the cover glass and the optical guide having a greater refractive index than the cover glass, according to an embodiment of the present disclosure.
Figure 11C:
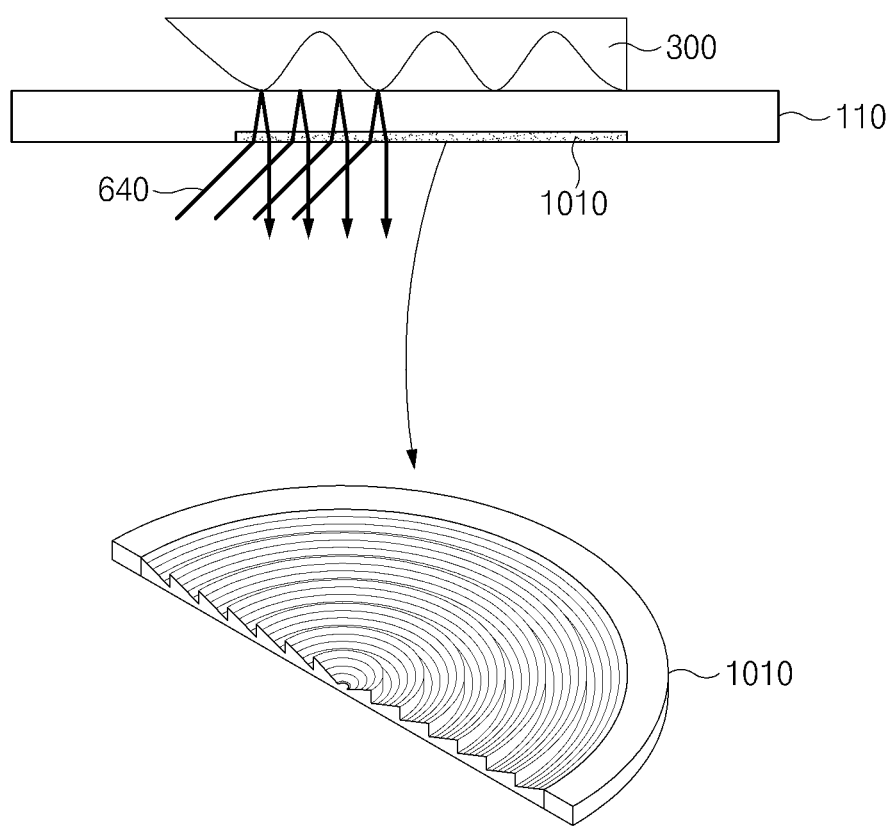
FIG. 11C is a sectional view of the cover glass and the optical guide having a preset shape on a surface thereof, according to an embodiment of the present disclosure.
Figure 11D:
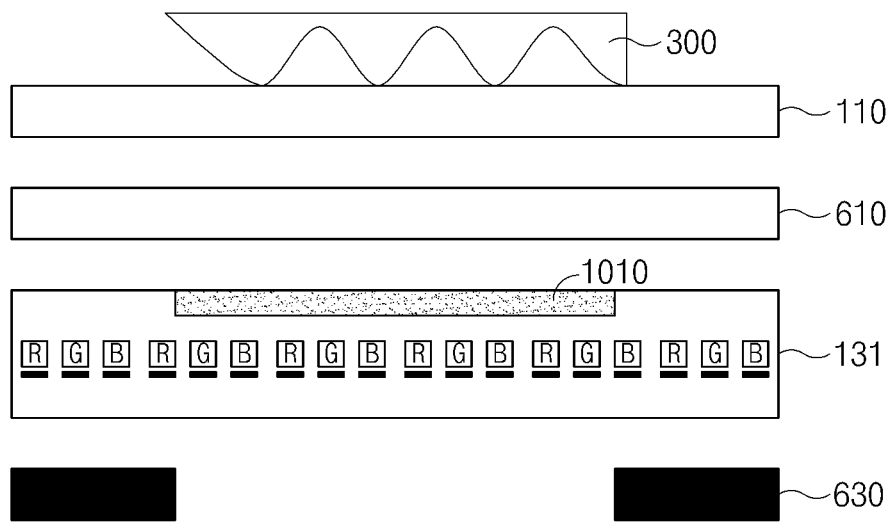
FIG. 11D is a sectional view of the electronic device and the optical guide to which no voltage is applied, according to an embodiment of the present disclosure.
Figure 11E:
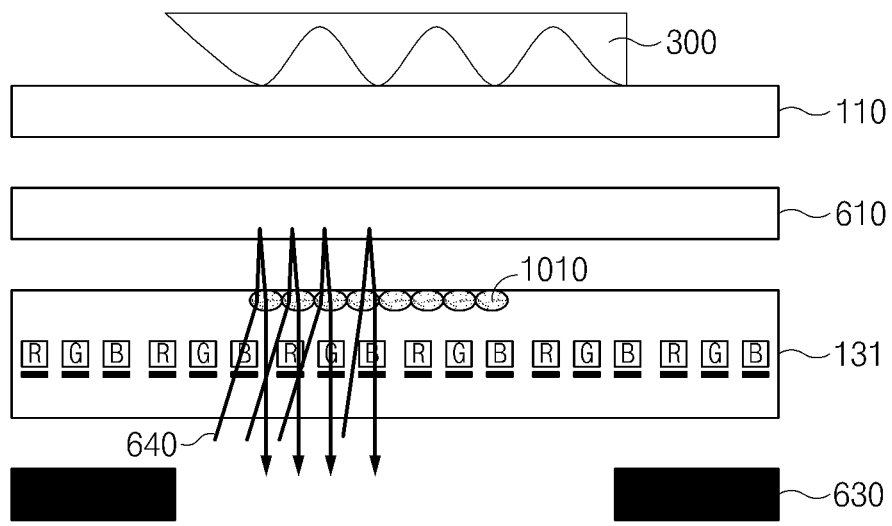
FIG. 11E is a sectional view of the electronic device and the optical guide to which a voltage is applied, according to an embodiment of the present disclosure.
Figure 11F:
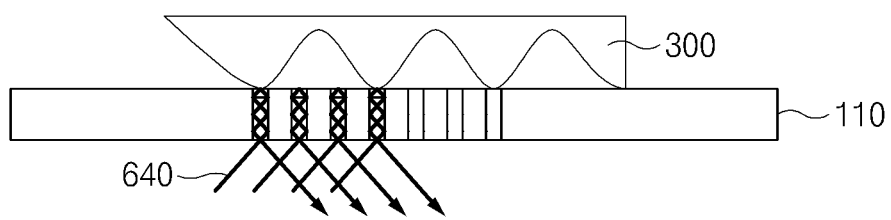
FIG. 11F is a sectional view of the cover glass and a hole formed through the cover glass, according to an embodiment of the present disclosure.

FIG. 11A is a sectional view of the cover glass 110 and the optical guide 1010 having the same refractive index as the cover glass 110. FIG. 11B is a sectional view of the cover glass 110 and the optical guide 1010 having a greater refractive index than the cover glass 110. FIG. 11C is a sectional view of the cover glass 110 and the optical guide 1010 having a preset shape on a surface thereof. FIG. 11D is a sectional view of the electronic device 100 and the optical guide 1010 to which no voltage is applied. FIG. 11E is a sectional view of the electronic device 100 and the optical guide 1010 to which a voltage is applied. FIG. 11F is a sectional view of the cover glass 110 and a hole formed through the cover glass 110.

Referring to FIG. 11A, the optical guide 1010 may be disposed in a semi-circular form on a surface of the cover glass 110. The refractive index of the optical guide 1010 may be substantially the same as that of the cover glass 110. In the case where the optical guide 1010 has the same refractive index as the cover glass 110, the straight light 640 may travel straight without being refracted within the optical guide 1010 and the cover glass 110. The straight light 640 may be refracted at the boundary of the optical guide 1010 and at the boundary of the cover glass 110, unlike within the optical guide 1010 and the cover glass 110. The refracted straight light 640 may be incident on the fingerprint sensor 171.

Referring to FIG. 11B, the optical guide 1010 may be disposed in a circular form on a surface of the cover glass 110. The refractive index of the optical guide 1010 may be greater than that of the cover glass 110. In the case where the optical guide 1010 has a greater refractive index than the cover glass 110, the straight light 640 may be refracted at the boundary of the optical guide 1010 and at the boundary of the cover glass 110. For example, the straight light 640 may be refracted while passing through two interfaces of the optical guide 1010 and may be refracted at the boundary of the cover glass 110. The light refracted at the boundary of the cover glass 110 may be incident on the fingerprint sensor 171 while passing through the two interfaces of the optical guide 1010 again. The refractive index of the optical guide 1010 may vary depending on the material (e.g., glass) of the optical guide 1010. For example, the optical guide 1010 may have a smaller refractive index than the cover glass 110. While FIGS. 11A and 11B show that the optical guide 1010 has a semi-circular or circular form, the optical guide 1010 may have a triangular form, and the form of the optical guide 1010 is not limited to the above described embodiments of the present disclosure.

Referring to FIG. 11C, the optical guide 1010 may include a pattern having a preset shape on a surface thereof. The optical guide 1010 may be a lens (e.g., a diffractive optical element (DOE) lens) that has a preset shape on a surface thereof. As shown in FIG. 11C, the pattern may have a repeated arrangement of saw-tooth shapes and may be symmetrical with respect to the center of the optical guide 1010. The refractive index of the optical guide 1010 may be varied depending on the shape of the surface of the optical guide 1010. For example, the thickness of the optical guide 1010 may be varied depending on the shape of the surface of the optical guide 1010, and the refractive index of the optical guide 1010 may be increased with an increasing thickness of the optical guide 1010.

Referring to FIGS. 11D and 11E, the optical guide 1010 may be transformed from a liquid layer into a lens having a preset shape if a voltage is applied to opposite ends of the optical guide 1010. For example, the optical guide 1010 may be a transparent liquid crystal lens that has optical characteristics varying depending on whether a voltage is applied thereto. While FIG. 11E shows that the optical guide 1010 is transformed into a circular lens if a voltage is applied to the opposite ends of the optical guide 1010, the preset shape is not limited thereto.

Since the optical guide 1010 is in a liquid layer state before a voltage is applied thereto, the optical guide 1010 may not refract light. However, since the optical guide 1010 is transformed into a lens having a preset shape if a voltage is applied thereto, the optical guide 1010 may refract light emitted from the display 130 and may use the refracted light as the reflected light 650. The first or second processor 151a or 151b described with reference to FIG. 3 may control a battery to apply a voltage to the optical guide 1010. The first or second processor 151a or 151b may allow the battery to apply a voltage to the optical guide 1010 while applying a voltage to the display 130. The first or second processor 151a or 151b may also control the battery to independently apply a voltage to the optical guide 1010 to transform the optical guide 1010 into a lens having a preset shape.

Referring to FIG. 11F, the cover glass 110 may include a hole formed through the cover glass 110. The cover glass 110 may have a single hole, or may have a plurality of holes, for example the same number of holes as pixels. The hole may be present in only the fingerprint sensing area 110b described above with reference to FIG. 1, and the hole may have a circular cylindrical shape.

The hole formed through the cover glass 100 may refract light emitted from a pixel, and the refracted light may be used as the reflected light 650. For example, at least a portion of the light emitted from the pixel may be refracted while passing through the hole. At least a portion of the light refracted while passing through the hole may be reflected by the finger 300 making contact with the cover glass 110. At least a portion of the reflected light may be refracted again while passing through the hole and may be polarized in a specified direction. Since the light polarized in the specified direction passes through the first and second guide structures 610 and 620, the fingerprint sensor 171 may acquire fingerprint information based on the refracted light.

Figure 12A:
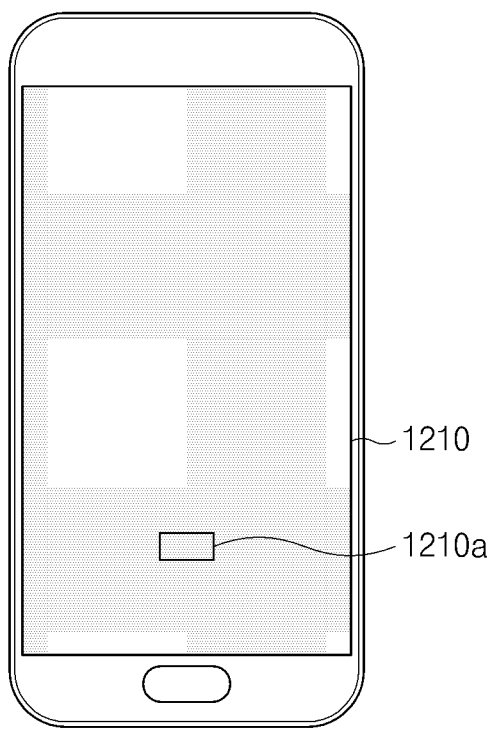
FIG. 12A is a view of the electronic device including a photo-chromic layer, according to an embodiment of the present disclosure.
Figure 12B:
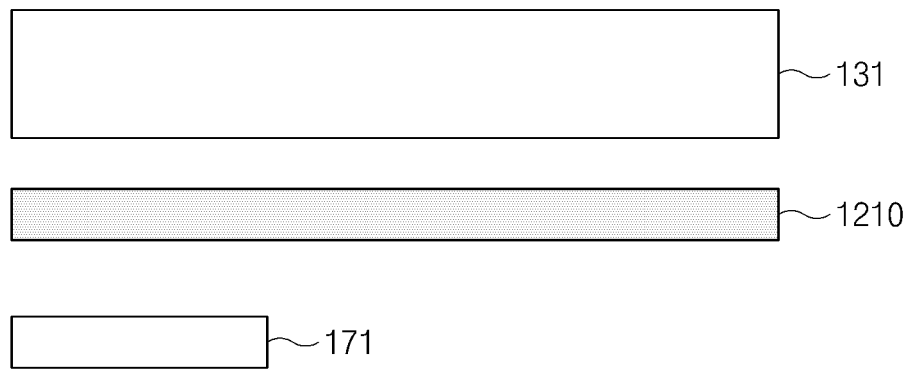
FIG. 12B is a sectional view of the electronic device including the photo-chromic layer, according to an embodiment of the present disclosure.

FIG. 12A is a view of the electronic device 100 including a photo-chromic layer 1210. FIG. 12B is a sectional view of the electronic device 100 including the photo-chromic layer 1210.

Referring to FIGS. 12A and 12B, the electronic device 100 may include the photo-chromic layer 1210 disposed over the fingerprint sensor 171 and having a hole in an area thereof that corresponds to the fingerprint sensor 171. The photo-chromic layer 1210 may change color if a current is applied to the photo-chromic layer 1210. For example, the photo-chromic layer 1210 in a transparent state may turn into an achromatic color if a current is applied thereto. The photo-chromic layer 1210, which has changed in color, may block out the external light 660 (e.g., sunlight) input to the fingerprint sensor 171 from outside the electronic device 100.

Unlike the external light 660, light emitted from the display panel 131 may be input to the fingerprint sensor 171 through a hole 1210a of the photo-chromic layer 1210. For example, the light emitted from the display panel 131 may be reflected by the finger 300 making contact with the cover glass 110 and may be input to the fingerprint sensor 171 through the hole 1210a. The fingerprint sensor 171 may acquire fingerprint information based on the light reflected by the finger 300 and input to the fingerprint sensor 171 through the hole 1210a. A fingerprint recognition rate may be increased by blocking out the external light 660 through the photo-chromic layer 1210.

The first processor 151a or second processor 151b described above with reference to FIG. 3 may control a battery to apply a current to the photo-chromic layer 1210. For example, the first processor 151a or second processor 151b may control the battery to apply a current to the photo-chromic layer 1210 when the fingerprint sensor 171 acquires fingerprint information. The first processor 151a or second processor 151b may also control the battery to apply a current to the photo-chromic layer 1210 if the finger 300 makes contact with the display panel 131.

While FIG. 12B shows that the photo-chromic layer 1210 is disposed between the display panel 131 and the fingerprint sensor 171, the photo-chromic layer 1210 has only to be disposed over the fingerprint sensor 171, and the photo-chromic layer 1210 may be disposed over the cover glass 110. The size of the hole may be the same as, or different from, that of the fingerprint sensing area 110b described above with reference to FIG. 1.

Figure 13A:
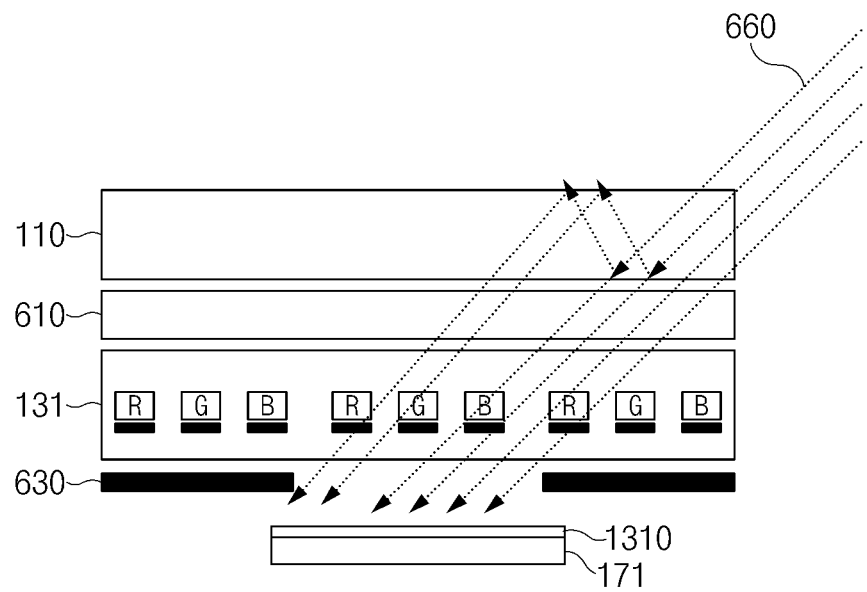
FIG. 13A is a sectional view of the electronic device including a filter disposed below the display panel thereof, according to an embodiment of the present disclosure.
Figure 13B:
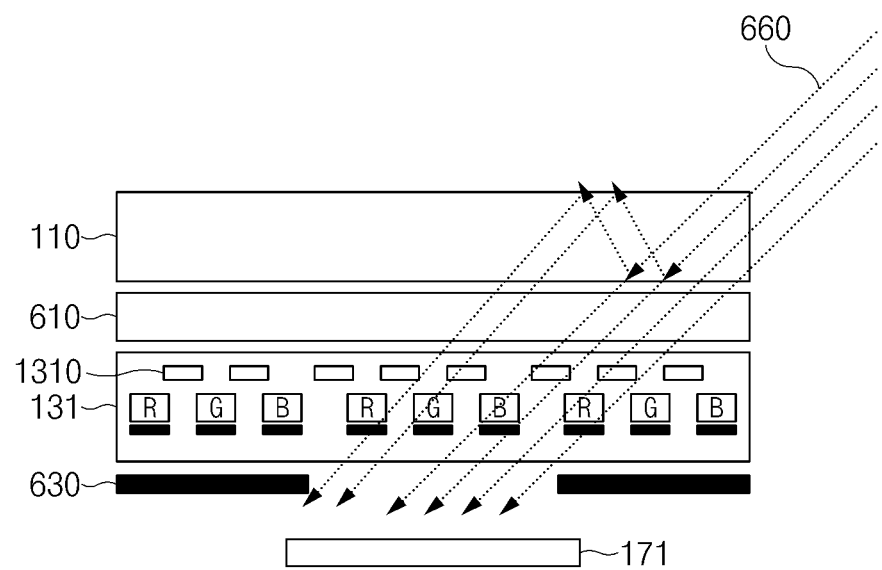
FIG. 13B is a sectional view of the electronic device including a filter disposed inside the display panel thereof, according to an embodiment of the present disclosure.
Figure 13C:
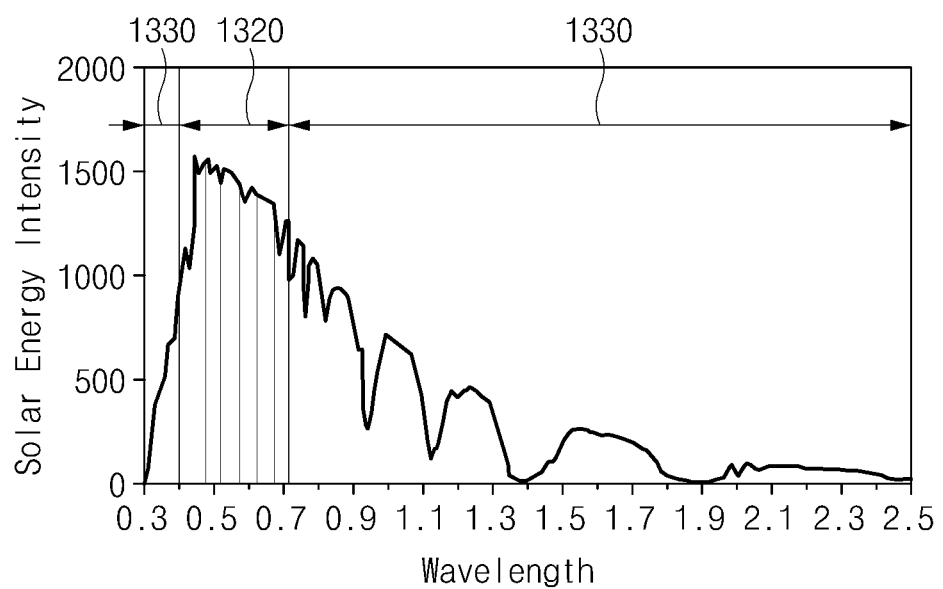
FIG. 13C illustrates a visible wavelength range and other wavelength ranges of external light, according to an embodiment of the present disclosure.

FIG. 13A is a sectional view of the electronic device 100 including a filter 1310 disposed below the display panel 131. FIG. 13B is a sectional view of the electronic device 100 including the filter 1310 disposed inside the display panel 131. FIG. 13C illustrates a visible wavelength range and other wavelength ranges of external light.

Referring to FIGS. 13A and 13B, the electronic device 100 may further include the filter 1310 disposed over the fingerprint sensor 171. Referring to FIG. 13A, the filter 1310 may be disposed between the display panel 131 and the fingerprint sensor 171, and referring to FIG. 13B, the filter 1310 may be disposed inside the display panel 131. In the case where the filter 1310 is disposed inside the display panel 131, the filter 1310 may be included in a pixel. Since a requirement for filter 1310 is that it be disposed over the fingerprint sensor 171, the filter 1310 may also be disposed over the cover glass 110 or below the cover glass 110.

While FIGS. 13A and 13B show that the filter 1310 is disposed inside the display panel 131, or between the display panel 131 and the fingerprint sensor 171, the filter 1310 may be disposed both inside the display panel 131 and between the display panel 131 and the fingerprint sensor 171. The filter 1310 may be a filter that transmits light in the visible wavelength range and may be a narrow RGB filter. The filter 1310 may also be the second guide structure 620 described above with reference to FIG. 6.

The filter 1310 may transmit light in a visible wavelength range 1320 to reduce noise input to the fingerprint sensor 171. Referring to FIG. 13C, the external light 660 (e.g., sunlight) introduced into the electronic device 100 from the outside may include light in various wavelength ranges. Since the external light 660 causes noise in the fingerprint sensor 171, the filter 1310 may filter light in wavelength ranges 1330 other than the visible wavelength range 1320 to reduce noise in the fingerprint sensor 171. While FIG. 13C shows that the filter 1310 transmits light in the visible wavelength range 1320, the filter 1310 may prevent light in the visible wavelength range 1320 from being input to the fingerprint sensor 171 and may transmit light in the wavelength ranges 1330 other than the visible wavelength range 1320. What is shown in FIG. 13C is given by way of illustration only, and the wavelength range of light that the filter 1310 transmits is not limited to what is shown in FIG. 13C.

Figure 14A:
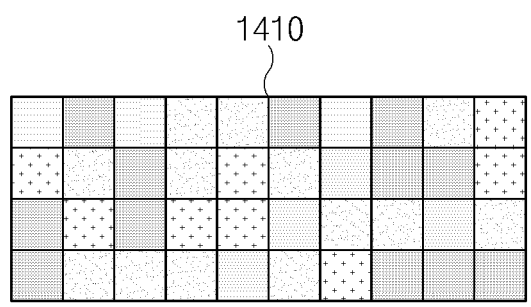
FIG. 14A illustrates noise distribution in the fingerprint sensor, according to an embodiment of the present disclosure.
Figure 14B:
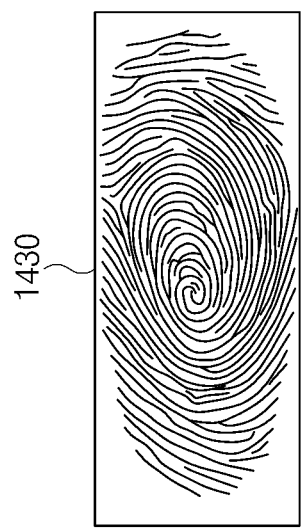
FIG. 14B illustrates a process in which the fingerprint sensor acquires fingerprint information with reduced noise by subtracting the noise distribution from acquired fingerprint information, according to an embodiment of the present disclosure.
Figure 14B:
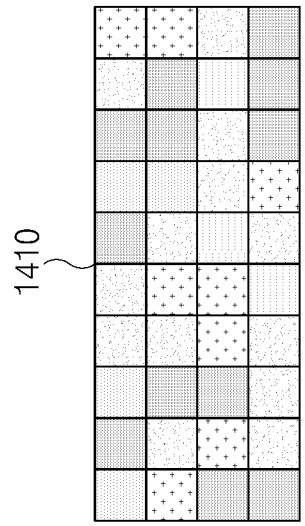
Figure 14B:
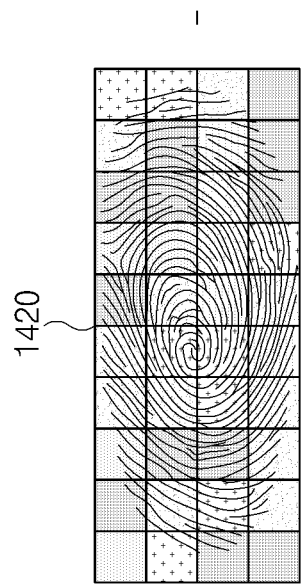

FIG. 14A illustrates noise distribution in the fingerprint sensor 171. FIG. 14B illustrates a process in which the fingerprint sensor 171 acquires fingerprint information with reduced noise by subtracting noise distribution from the acquired fingerprint information.

Referring to FIG. 14A, the fingerprint sensor 171 may acquire noise distribution 1410 that represents the degree to which light other than the reflected light 650, which has been described above with reference to FIG. 6, reaches the fingerprint sensor 171. For example, the fingerprint sensor 171 may acquire, as the noise distribution 1410, the degree to which the straight light 640 and the external light 660, which have been described above with reference to FIG. 6, reach the fingerprint sensor 171. The noise distribution 1410 may be acquired on a pixel-by-pixel basis or by regions of pixels. If the noise distribution 1410 is acquired, the memory 152 may store the noise distribution 1410.

Referring to FIG. 14B, the fingerprint sensor 171 may acquire fingerprint information based on light having passed through the first and second guide structures 610 and 620. The light having passed through the first and second guide structures 610 and 620 may include the straight light 640 and the external light 660, which have been described above with reference to FIG. 6, as well as the reflected light 650 reflected by the finger 300. Since only the reflected light 650 is necessary when the fingerprint sensor 171 acquires the fingerprint information, the straight light 640 and the external light 660 may cause noise in the fingerprint sensor 171.

Accordingly, the fingerprint sensor 171 may subtract the noise distribution 1410 from the acquired fingerprint information 1420 to acquire fingerprint information 1430 with reduced noise. The fingerprint information 1420 may be fingerprint information acquired through the electronic device 100 shown in FIG. 6, and the noise distribution 1410 may be the noise distribution shown in FIG. 14A. A fingerprint recognition rate may be increased by acquiring the fingerprint information 1430 with reduced noise by subtracting the noise distribution 1410.

An electronic device includes a cover glass forming an outer surface of the electronic device, a first guide structure disposed below the cover glass and transmitting light polarized in a specified direction, a display panel disposed below the first guide structure and including a plurality of pixels, a second guide structure disposed below the display panel and transmitting light polarized in the specified direction, and a fingerprint sensor disposed below the second guide structure.

The electronic device may further include an opaque member disposed below the display panel, and the opaque member may include an opening in an area corresponding to the fingerprint sensor.

The electronic device may further include a protective layer disposed below the display panel, and the second guide structure may be disposed at the protective layer. The protective layer may include at least one of an embo, a sponge, and a copper (Cu) graphite coating layer.

The fingerprint sensor may acquire a user's fingerprint information using light that passed through the first and second guide structures, from reflected light from when the user's finger made contact with the cover glass which was emitted from the display panel.

The fingerprint sensor may recognize a fingerprint acquiring noise distribution that represents the degree to which light other than the reflected light reaches the fingerprint sensor and subtracting the noise distribution from the fingerprint information.

Each of the plurality of pixels may include a first sub-pixel, a second sub-pixel, and opaque electrodes disposed below the respective first and second sub-pixels. The second guide structure may be disposed below the first sub-pixel. If the first sub-pixel is turned off and the second sub-pixel is turned on, the fingerprint sensor may acquire a user's fingerprint information using light that passed through the first and second guide structures, from reflected light from when a user's finger made contact with the cover glass after the light was emitted from the second sub-pixel.

The electronic device may further include an optical guide refracting at least a portion of the light emitted from the plurality of pixels and refracting light reflected by a user's finger making contact with the cover glass.

The optical guide may be disposed in a semi-circular form on a surface of the cover glass, and the optical guide may have a refractive index corresponding to the refractive index of the cover glass.

The optical guide may be disposed in a circular form on a surface of the cover glass, and the optical guide may have a refractive index greater than a refractive index of the cover glass.

The optical guide may include a pattern having a preset shape on a surface of the optical guide.

The optical guide may be transformed from a liquid layer into a lens having a preset shape if a voltage is applied to the optical guide.

The cover glass may include a hole formed through the cover glass. The hole may refract at least a portion of light emitted from the plurality of pixels and may refract light reflected by a finger making contact with the cover glass from the refracted light.

The electronic device may further include a photo-chromic layer disposed over the fingerprint sensor and having a hole in an area corresponding to the fingerprint sensor. The photo-chromic layer may change in color if a current is applied to the photo-chromic layer, and the photo-chromic layer may block out external light input to the fingerprint sensor from outside the electronic device.

The electronic device may further include a filter disposed over the fingerprint sensor and transmitting light in a visible wavelength range.

An electronic device includes a cover glass forming an outer surface of the electronic device, a first guide structure disposed below the cover glass and transmitting light polarized in a specified direction, and a display panel disposed below the first guide structure and including a plurality of pixels. The display panel may include a second guide structure transmitting light polarized in the specified direction and a pixel layer disposed below the second guide structure and including the plurality of pixels. Each of the plurality of pixels may include a plurality of sub-pixels and a fingerprint sensor.

The fingerprint sensor may acquire a user's fingerprint information using light that passed through the first and second guide structures, from light reflected by a user's finger making contact with the cover glass after emitted from the plurality of pixels. The electronic device may further include an optical guide refracting at least a portion of light emitted from the plurality of pixels and refracting light reflected by a finger making contact with the cover glass from the refracted light.

The electronic device may further include a photo-chromic layer disposed over the fingerprint sensor and having a hole in an area corresponding to the fingerprint sensor. The photo-chromic layer may change in color if a current is applied to the photo-chromic layer, and the photo-chromic layer may block out external light input to the fingerprint sensor from outside the electronic device.

An electronic device may include a cover glass forming an outer surface of the electronic device, a first guide structure disposed below the cover glass and transmitting light polarized in a specified direction, a display panel disposed below the first guide structure and including a plurality of pixels and a second guide structure transmitting light polarized in the specified direction, and a fingerprint sensor disposed below the display panel.

Figure 15:
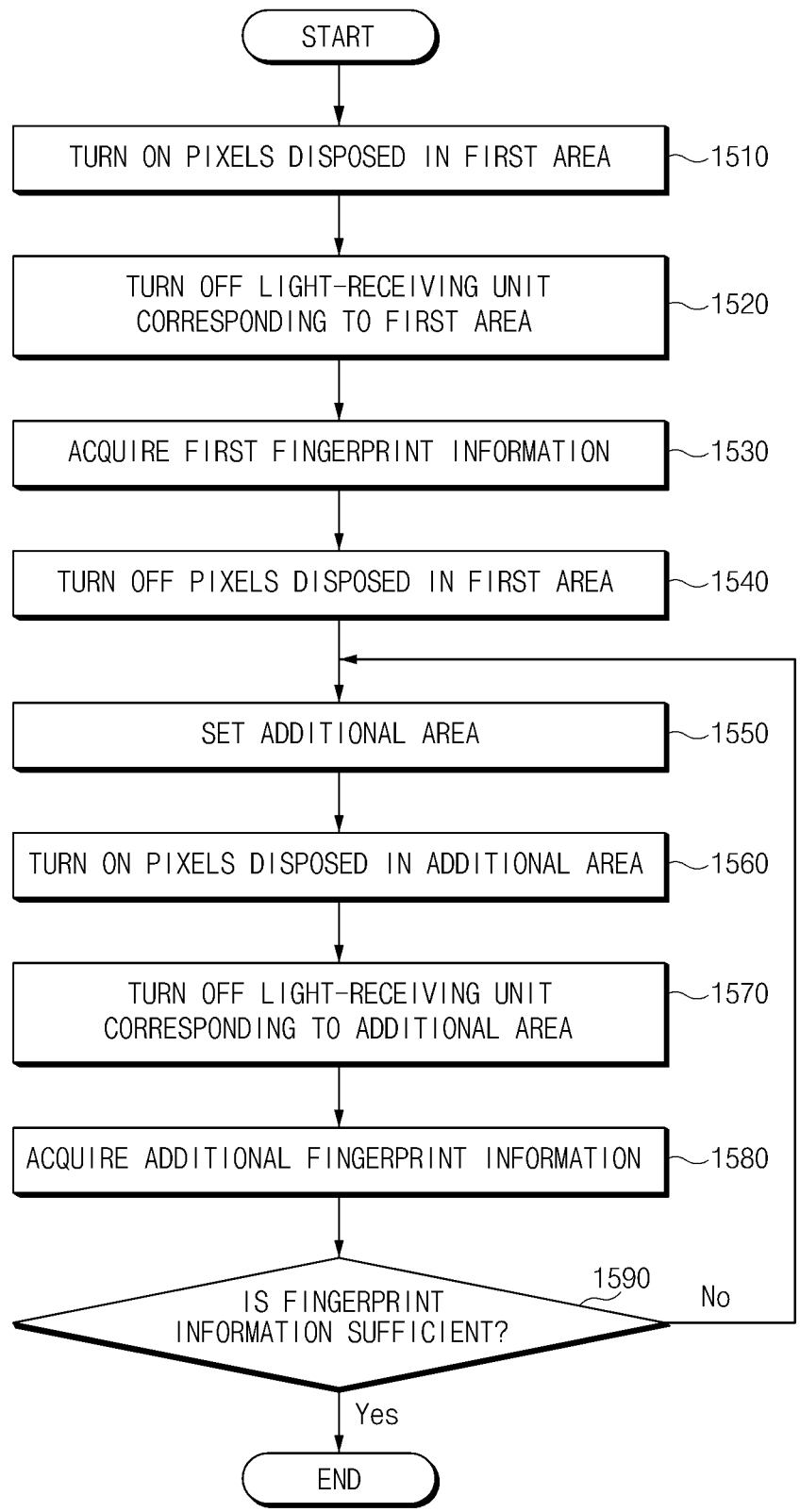
FIG. 15 is a flowchart illustrating a process of acquiring fingerprint information by turning on pixels arranged in a region of a display, according to an embodiment of the present disclosure.
Figure 16:
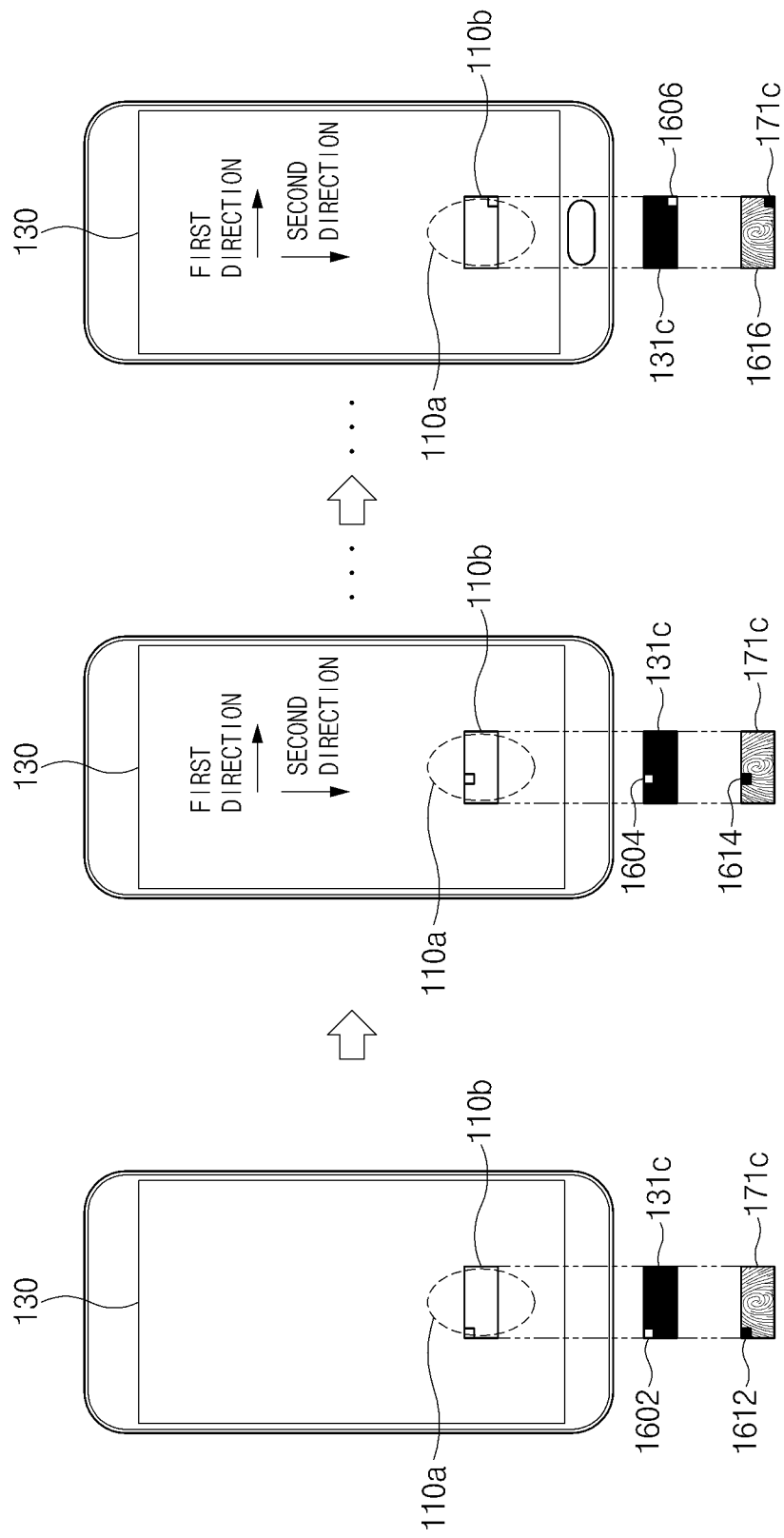
FIG. 16 illustrates the electronic device that includes the display, a region of which is turned on, the fingerprint sensor, and a region of which is turned off, according to an embodiment of the present disclosure.

FIG. 15 is a flowchart illustrating a process of acquiring fingerprint information by turning on pixels arranged in a region of the display 130. FIG. 16 illustrates the electronic device 100 that includes the display 130, a region of which is turned on, the fingerprint sensor 171, and a region of which is turned off. In the present disclosure, a direction (e.g., a first direction and a second direction) may be any direction on the display 130.

Referring to FIGS. 15 and 16, in step 1510, the processor 151 may allow the display 130 to turn on (or activate) pixels (or light emitting elements) arranged in a first region 1602 if a finger makes contact with the fingerprint sensing area 110*b*. The fingerprint sensing area 110*b* and the contact area 110*a* with which the finger makes contact may be the same as the fingerprint sensing area 110*b* and the contact area 110*a* described above with reference to FIG. 1. The first region 1602 may correspond to the fingerprint sensing area 110*b* and may include at least some of the pixels included in the display 130.

If the pixels are turned on, the processor 151 may, in step 1520, allow the fingerprint sensor 171 to turn off (or deactivate) a region 1612 of a light receiving unit 171*c* (or a light receiving element) that is associated with the first region 1602 in an area 131*c* corresponding to the fingerprint sensing area 110*b*. The fingerprint sensor 171 may include the light receiving unit 171*c* that receives light, and the light receiving unit 171*c* may be divided into a plurality of regions. When the fingerprint sensor 171 turns off the region 1612 of the light receiving unit 171*c* that corresponds to the first region 1602, the processor 151 may turn on the remaining regions of the light receiving unit 171*c* that do not correspond to the first region 1602.

If the light receiving unit 171*c* and the pixels are disposed adjacent to each other, light emitted from the pixels may be directly input to the light receiving unit 171*c*. Since the light directly input to the light receiving unit 171*c* can cause noise in the fingerprint sensor 171, a fingerprint recognition rate may be increased by turning off the region 1612 of the light receiving unit 171*c* that corresponds to the turned on pixels.

If the region 1612 of the light receiving unit 171*c* that corresponds to the first region 1602 is turned off, the processor 151 may, in step 1530, allow the fingerprint sensor 171 to acquire a first fingerprint information based on light emitted from the pixels arranged in the first region 1602. The light emitted from the pixels arranged in the first region 1602 may be reflected by the finger 300 making contact with the cover glass 110, and the fingerprint sensor 171 may acquire the a first fingerprint information based on the reflected light.

Since the region 1612 of the light receiving unit 171*c* that corresponds to the first region 1602 is turned off in step 1520, fingerprint information in the region 1612 corresponding to the first region 1602 may not be acquired. However, since the remaining regions of the light receiving unit 171*c* that do not correspond to the first region 1602 are turned on, the fingerprint sensor 171 may acquire the first fingerprint information through the regions thereof that do not correspond to the first region 1602.

If the first fingerprint information is acquired, the processor 151 may, in step 1540, allow the display 130 to turn off the pixels arranged in the first region 1602. If the pixels arranged in the first region 1602 are turned off, the processor 151 may set a second region 1604 in step 1550. The second region 1604 may correspond to the fingerprint sensing area 110b and may include at least some of the pixels included in the display 130. The first and second regions 1602 and 1604, respectively, may or may not overlap each other. While FIG. 16 shows that the second region 1604 is set to be spaced apart from the first region 1602 in the first direction, the second region 1604 may be set to be spaced apart from the first region 1602 in the second direction.

The second region 1604 may be set based on the first fingerprint information. For example, the processor 151 may acquire fingerprint information that is not present in the first fingerprint information. If fingerprint information that is not present in the first fingerprint information is acquired, the processor 151 may set the second region 1604 to acquire the fingerprint information that is not present in the first fingerprint information. Referring to FIG. 16, since a portion of the left region of the fingerprint area does not exist, the processor 151 may set the second region 1604 to acquire the portion of the left region of the fingerprint area.

If the second region 1604 is set, the processor 151 may, in step 1560, allow the display 130 to turn on the pixels arranged in the second region 1604. If the pixels arranged in the second region 1604 are turned on, the processor 151 may, in step 1570, allow the fingerprint sensor 171 to turn off a region 1614 of the light receiving unit 171c that corresponds to the second region 1604. If the region 1614 of the light receiving unit 171c is turned off, the processor 151 may, in step 1580, allow the fingerprint sensor 171 to acquire a second fingerprint information based on light emitted from the pixels arranged in the second region 1604.

If the second fingerprint information is acquired, the processor 151 may, in step 1590, determine whether the acquired fingerprint information is sufficient. For example, the processor 151 may determine whether the acquired fingerprint image is greater than or equal to an area set in advance. If the acquired fingerprint image is greater than or equal to the area set in advance, the processor 151 may store, in the memory 152, the positions of minutia points, the distribution of minutia points, and the like on the basis of the acquired fingerprint image. If the acquired fingerprint image is smaller than the area set in advance, the processor 151 may set an additional region 1606 to acquire an additional image. The processor 151 may repeat steps 1550 to 1580 until a sufficient fingerprint image is acquired.

Referring to FIG. 16, in the case where the processor 151 repeats steps 1550 to 1580, the processor 151 may set an additional region 1606 while moving the additional region 1606 on the display 130 in the first direction. The processor 151 may set the additional region 1606 such that the additional region 1606 is spaced apart from the first region 1602 in the second direction. If the processor 151 sets the additional region 1606, acquired additional fingerprint information may also be varied depending on the position of the additional region 1606. The processor 151 may repeat steps 1550 to 1580 until sufficient fingerprint information is acquired by adding additional fingerprint information.

FIGS. 17A to 17D illustrate the display 130 that includes pixels turned on in a predetermined sequence and the fingerprint sensor 171 that acquires fingerprint information based on light emitted from the turned on pixels.

Figure 17A:
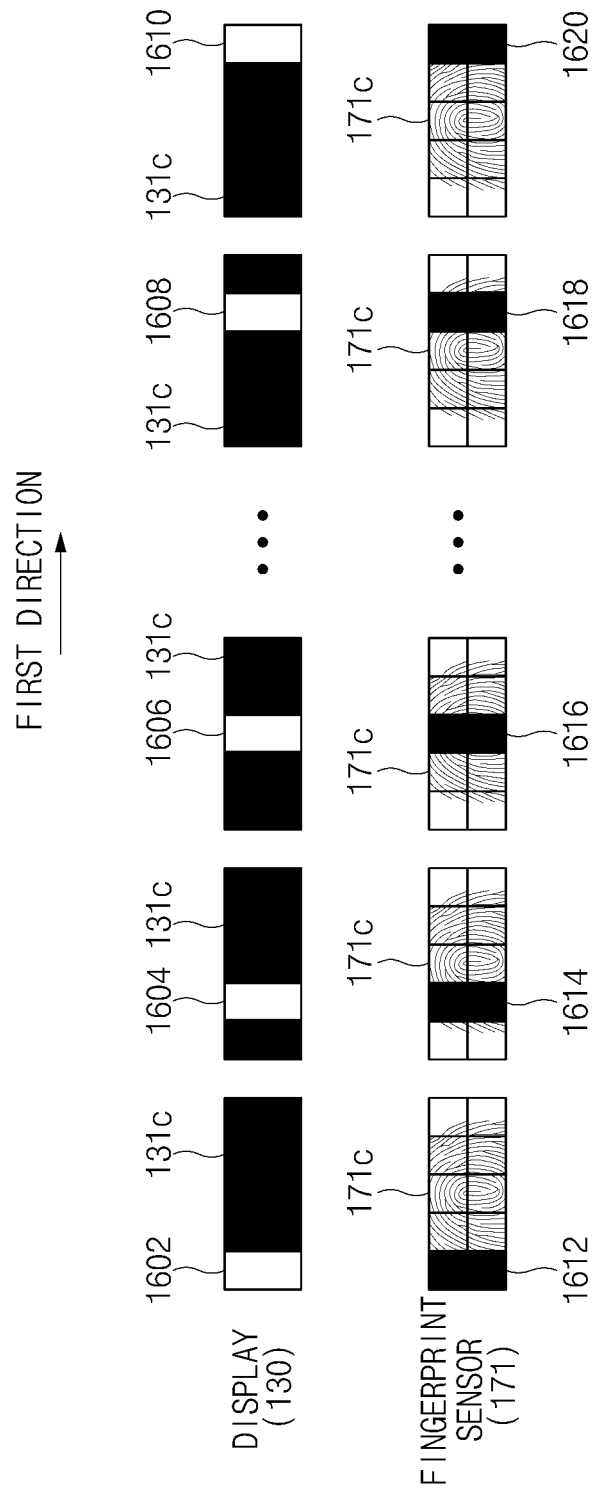
FIGS. 17A to 17D illustrate the display panel that includes pixels turned on in a predetermined sequence and the fingerprint sensor that acquires fingerprint information based on light emitted from the turned on pixels, according to an embodiment of the present disclosure.

Referring to FIG. 17A, the processor 151 may allow the display 130 to turn on pixels arranged in the first region 1602. In response to the turn on of the pixels arranged in the first region 1602, the processor 151 may turn off the region 1612 of the light receiving unit 171c that corresponds to the first region 1602. If the pixels arranged in the first region 1602 are turned on and the region 1612 of the light receiving unit 171c is turned off, the processor 151 may allow the fingerprint sensor 171 to acquire a first fingerprint information based on light emitted from the pixels arranged in the first region 1602.

If the first fingerprint information is acquired, the processor 151 may set the second region 1604 such that the second region 1604 is spaced apart from the first region 1602 on the display 130 in the first direction. If the second region 1604 is set, the processor 151 may allow the fingerprint sensor 171 to acquire a second fingerprint information based on light emitted from pixels arranged in the second region 1604. While FIG. 17A shows that the second region 1604 is set to be spaced apart from the first region 1602 in the first direction, the position of the second region 1604 may be different from that is shown in FIG. 17A. Furthermore, while FIG. 17A shows that the second region 1604 has the same size and shape as the first region 1602, the size and shape of the second region 1604 are not limited to the above described embodiment of the present disclosure.

If the second fingerprint information is acquired, the processor 151 may determine whether the fingerprint information is sufficient, and may set the additional region 1606 if the fingerprint information is insufficient. The additional region 1606 may be spaced apart from the second region 1604 on the display 130 in the first direction. If the additional region 1606 is set, the processor 151 may allow the fingerprint sensor 171 to acquire additional fingerprint information based on light emitted from pixels arranged in the additional region 1606. The method of acquiring the additional fingerprint information by the processor 151 may be the same as the method of acquiring the first and second fingerprint information. For example, a region 1616 of the light receiving unit 171c may be turned off when the pixels arranged in the additional region 1606 are turned on. If sufficient fingerprint information is not acquired despite the additional fingerprint information, the processor 151 may repeatedly set other additional regions 1608 and 1610 until sufficient fingerprint information is acquired. When pixels arranged in the other additional regions 1608 and 1610 are turned on, regions 1618 and 1620 of the light receiving unit 171c may be turned off.

While FIG. 17A shows that the additional region 1606 is set to be spaced apart from the second region 1604 in the first direction, the position of the additional region 1606 may be different from that shown in FIG. 17A. For example, the additional region 1606 may be set at the position of the first region 1602. Furthermore, while FIG. 17A shows that the additional region 1606 has the same size and shape as the second region 1604, the size and shape of the additional region 1606 are not limited to the above described embodiment of the present disclosure.

Figure 17B:
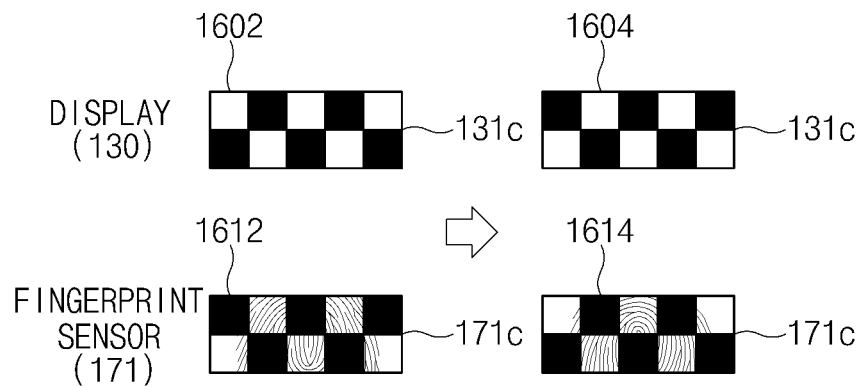

Referring to FIG. 17B, the processor 151 may allow the display 130 to turn on pixels arranged in the first region 1602. If the pixels arranged in the first region 1602 are turned on, the processor 151 may acquire a first fingerprint information based on light emitted from the pixels arranged in the first region 1602. When the pixels arranged in the first region 1602 are turned on, the region 1612 of the light receiving unit 171c may be turned off. If the first fingerprint information is acquired, the processor 151 may set the remaining regions other than the first region 1602, from the area 131c corresponding to the fingerprint sensing area 110b, as the second region 1604. The processor 151 may set the whole area 131c, which corresponds to the fingerprint sensing area 110b, as the second region 1604 and may set the second region 1604 such that a portion of the first region 1602 is included in the second region 1604. If the second region 1604 is set, the processor 151 may allow the fingerprint sensor 171 to acquire a second fingerprint information based on light emitted from pixels arranged in the second region 1604. When the pixels arranged in the second region 1604 are turned on, the region 1614 of the light receiving unit 171c may be turned off.

Figure 17C:
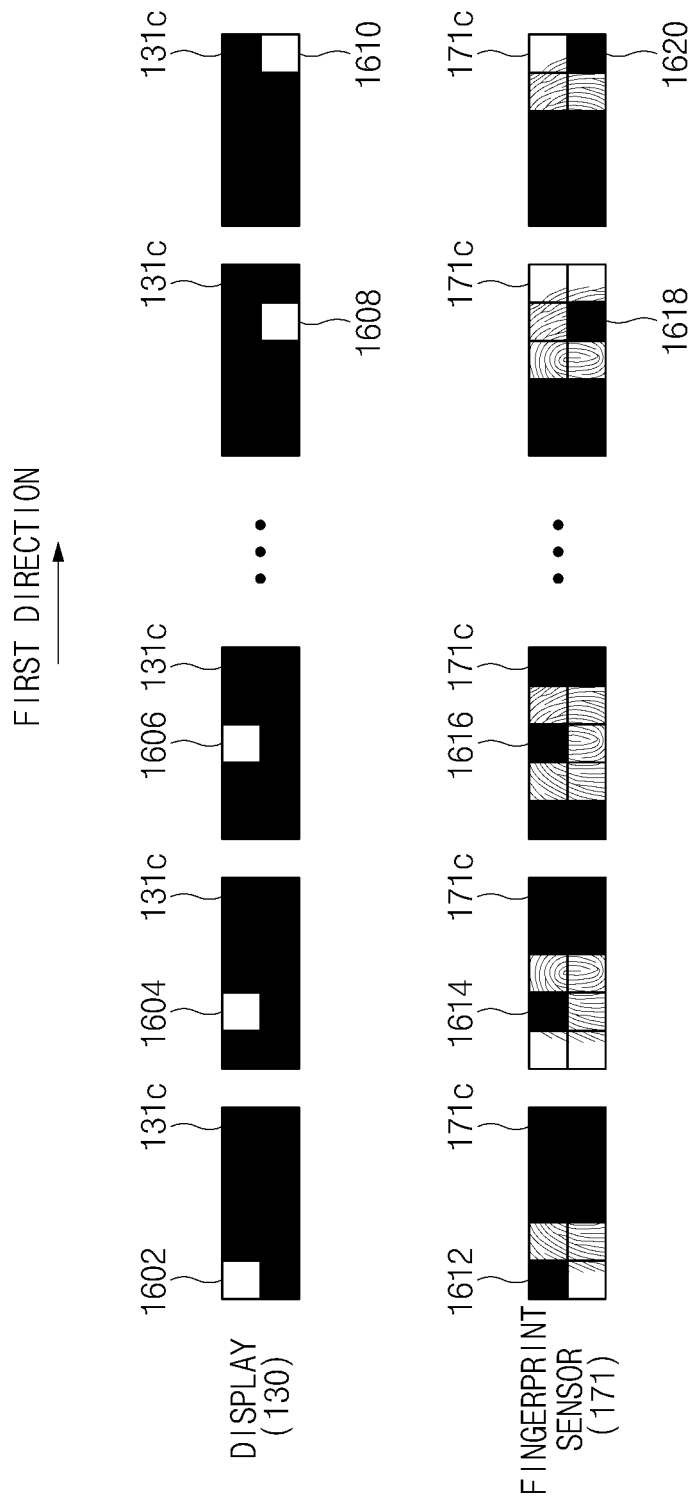

Referring to FIG. 17C, the processor 151 may allow the display 130 to turn on pixels arranged in the first region 1602. If the pixels arranged in the first region 1602 are turned on, the processor 151 may allow the fingerprint sensor 171 to turn on only regions that are spaced a predetermined distance apart from the region 1612 of the light receiving unit 171c that corresponds to the first region 1602. The processor 151 may allow the fingerprint sensor 171 to acquire a first fingerprint information through the turned on regions.

If the first fingerprint information is acquired, the processor 151 may set the second region 1604 such that the second region 1604 is spaced apart from the first region 1602 in the first direction. If the second region 1604 is set, the processor 151 may allow the fingerprint sensor 171 to turn on only regions that are spaced a predetermined distance apart from the region 1614 of the light receiving unit 171c that corresponds to the second region 1604. The processor 151 may allow the fingerprint sensor 171 to acquire a second fingerprint information through the turned on regions.

If the second fingerprint information is acquired, the processor 151 may determine whether the fingerprint information is sufficient, and in the case where the fingerprint information is insufficient, the processor 151 may set the additional region 1606. The additional region 1606 may be set to be spaced apart from the second region 1604 on the display 130 in the first direction. If the additional region 1606 is set, the processor 151 may allow the fingerprint sensor 171 to turn on only regions that are spaced a predetermined distance apart from the region 1616 of the light receiving unit 171c that corresponds to the additional region 1606. The processor 151 may allow the fingerprint sensor 171 to acquire additional fingerprint information through the turned on regions. If sufficient fingerprint information is not acquired despite the additional fingerprint information, the processor 151 may repeatedly set the other additional regions 1608 and 1610 until sufficient fingerprint information is acquired. When pixels arranged in the other additional regions 1608 and 1610 are turned on, the processor 151 may allow the fingerprint sensor 171 to turn on only regions that are spaced a predetermined distance apart from the regions 1618 and 1620 of the light receiving unit 171c that correspond to the other additional regions 1608 and 1610.

Figure 17D:
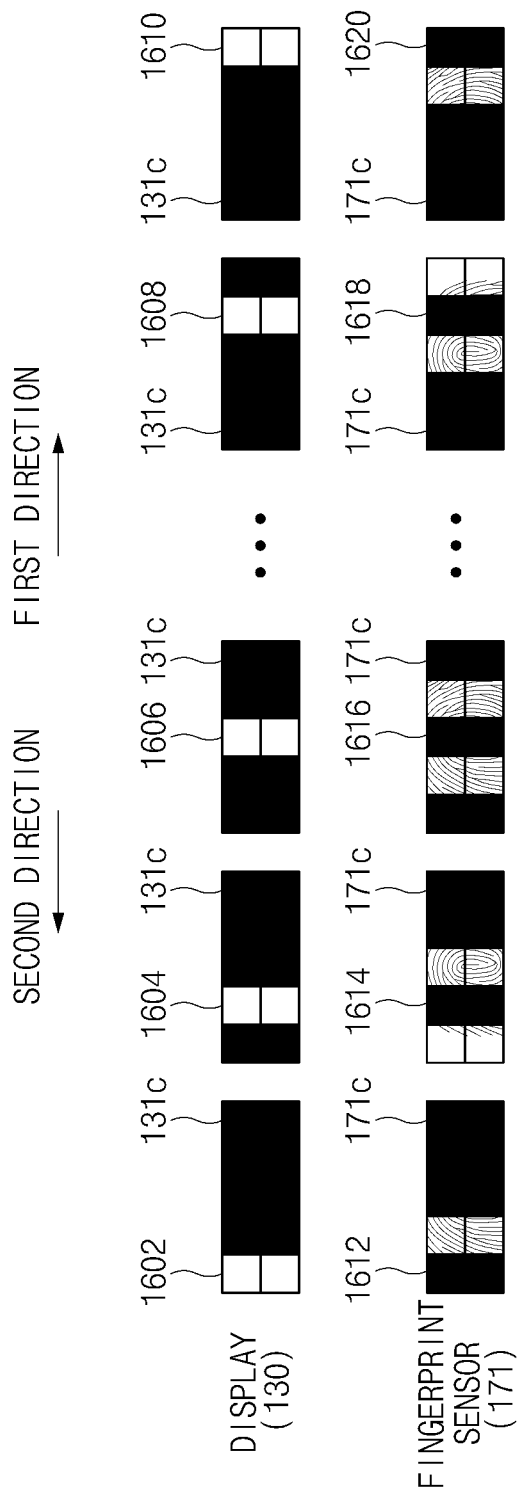

Referring to FIG. 17D, the processor 151 may allow the display 130 to turn on pixels arranged in the first region 1602. If the pixels arranged in the first region 1602 are turned on, the processor 151 may allow the fingerprint sensor 171 to turn on only regions oriented in the first and/or second direction from the region 1612 of the light receiving unit 171c that corresponds to the first region 1602. The processor 151 may allow the fingerprint sensor 171 to acquire a first fingerprint information through the turned on regions.

If the first fingerprint information is acquired, the processor 151 may set the second region 1604 such that the second region 1604 is spaced apart from the first region 1602 in the first direction. If the second region 1604 is set, the processor 151 may allow the fingerprint sensor 171 to turn on only regions oriented in the first and/or second direction from the region 1614 of the light receiving unit 171c that corresponds to the second region 1604. The processor 151 may allow the fingerprint sensor 171 to acquire a second fingerprint information through the turned on regions.

If the second fingerprint information is acquired, the processor 151 may determine whether the fingerprint information is sufficient, and in the case where the fingerprint information is insufficient, the processor 151 may set the additional region 1606. The additional region 1606 may be set to be spaced apart from the second region 1604 on the display 130 in the first direction. If the additional region 1606 is set, the processor 151 may allow the fingerprint sensor 171 to turn on only regions oriented in the first and/or second direction from the region 1616 of the light receiving unit 171c that corresponds to the additional region 1606. The processor 151 may allow the fingerprint sensor 171 to acquire additional fingerprint information through the turned on regions. If sufficient fingerprint information is not acquired despite the additional fingerprint information, the processor 151 may repeatedly set the other additional regions 1608 and 1610 until sufficient fingerprint information is acquired. When pixels arranged in the other additional regions 1608 and 1610 are turned on, the processor 151 may allow the fingerprint sensor 171 to turn on only regions oriented in the first and/or second direction from the regions 1618 and 1620 of the light receiving unit 171c that correspond to the other additional regions 1608 and 1610.

While FIG. 17D shows that the processor 151 sets the first region 1602, the second region 1604, and the additional region 1606 along the first direction, the first region 1602, the second region 1604, and the additional region 1606 may be set along the second direction. For example, the processor 151 may set the region 1610 as the first region and may set the region 1608 as the second region. If the second region is set, the processor 151 may set the region 1606 as the additional region.

The positions of pixels that are turned on, regions of the light receiving unit that are turned off, the positions of additional regions, and the like are not limited to what is shown in FIGS. 17A to 17D.

An electronic device includes a cover glass on which a fingerprint sensing area is displayed, a display panel disposed below the cover glass and including a plurality of pixels, a fingerprint sensor disposed below the display panel, and a processor electrically connected with the display panel and the fingerprint sensor. If a finger makes contact with the fingerprint sensing area, the processor may allow the display panel to turn on pixels arranged in a first region of an area thereof that corresponds to the area with which the finger makes contact. In response to the turn on of the pixels arranged in the first region, the processor may allow the fingerprint sensor to acquire a first fingerprint information based on light emitted from the pixels arranged in the first region. In response to the acquisition of the first fingerprint information, the processor may allow the display panel to turn off the pixels arranged in the first region and to turn on pixels arranged in a second region of the area thereof that corresponds to the area with which the finger makes contact.

In response to the turn on of the pixels arranged in the second region, the processor may allow the fingerprint sensor to acquire a second fingerprint information based on light emitted from the pixels arranged in the second region.

The fingerprint sensor may include a light receiving unit that is divided into a plurality of regions. In response to the turn on of the pixels arranged in the first region, the processor may allow the fingerprint sensor to turn off a region corresponding to the first region, from the plurality of regions of the light receiving unit. In response to the turn on of the pixels arranged in the second region, the processor may allow the fingerprint sensor to turn off a region corresponding to the second region, from the plurality of regions of the light receiving unit.

The electronic device may include a first guide structure disposed below the cover glass and transmitting light polarized in a specified direction, and a second guide structure disposed between the display panel and the fingerprint sensor and transmitting light polarized in the specified direction.

The fingerprint sensor may acquire the first fingerprint information based on light having passed through the first and second guide structures, from light reflected by a user's finger making contact with the cover glass after emitted from the pixels arranged in the first region, and the fingerprint sensor may acquire the second fingerprint information based on light having passed through the first and second guide structures, from light reflected by the user's finger making contact with the cover glass after emitted from the pixels arranged in the second region.

An electronic device includes a cover glass on which a fingerprint sensing area is displayed, a display panel disposed below the cover glass and including a plurality of pixels, a fingerprint sensor disposed below the display panel, and a processor electrically connected with the display panel and the fingerprint sensor. If a finger makes contact with the fingerprint sensing area, the processor may allow the display panel to turn on pixels arranged in a first region of an area thereof that corresponds to the area with which the finger makes contact. In response to the turn on of the pixels arranged in the first region, the processor may allow the fingerprint sensor to acquire a first fingerprint image based on light emitted from the pixels arranged in the first region. In response to the acquisition of the first fingerprint image, the processor may allow the display panel to turn off the pixels arranged in the first region and to turn on pixels arranged in a second region of the area thereof that corresponds to the area with which the finger makes contact, based on the first fingerprint image. In response to the turn on of the pixels arranged in the second region, the processor may allow the fingerprint sensor to acquire a second fingerprint image based on light emitted from the pixels arranged in the second region.

The fingerprint sensor may include a light receiving unit having a plurality of divided regions. In response to the turn on of the pixels arranged in the first region, the processor may allow the fingerprint sensor to turn off a region corresponding to the first region, from the plurality of regions of the light receiving unit. In response to the turn on of the pixels arranged in the second region, the processor may allow the fingerprint sensor to turn off a region corresponding to the second region, from the plurality of regions of the light receiving unit.

The electronic device may further include a first guide structure disposed below the cover glass and transmitting light polarized in a specified direction, and a second guide structure disposed between the display panel and the fingerprint sensor and transmitting light polarized in the specified direction.

The fingerprint sensor may acquire the first fingerprint image based on light that passed through the first and second guide structures, from reflected light reflected by a user's finger making contact with the cover glass after emitted from the pixels arranged in the first region, and the fingerprint sensor may acquire the second fingerprint image based on light that passed through the first and second guide structures, from reflected light reflected by the user's finger making contact with the cover glass after emitted from the pixels arranged in the second region.

An electronic device includes a display that provides a light source for an image sensor, a fingerprint sensor disposed on a bottom surface of the display panel, and a processor. The processor may be configured to activate a first light emitting element of the display if sensing a user's fingerprint input on the display; activate a first light receiving element of the fingerprint sensor that has been configured in advance to correspond to the first light emitting element of the display; acquire a first fingerprint image corresponding to the fingerprint through the first light receiving element; deactivate the first light emitting element and the first light receiving element; activate a second light emitting element of the display and a second light receiving element of the fingerprint sensor that has been configured in advance to correspond to the second light emitting element; acquire a second fingerprint image corresponding to the fingerprint through the second light receiving element; and acquire a third fingerprint image by composing the first and second fingerprint images.

An electronic device includes a display that provides a light source for an image sensor, a fingerprint sensor disposed on a bottom surface of the display panel, and a processor. The processor may be configured to activate a first light emitting element of the display if sensing a user's fingerprint input on the display; activate a light receiving element of the fingerprint sensor; acquire a first fingerprint image corresponding to the fingerprint through the light receiving element; create first information about at least a region of the first fingerprint image that corresponds to the first light emitting element; deactivate the first light emitting element; activate a second light emitting element of the display; acquire a second fingerprint image corresponding to the fingerprint through the light receiving element of the fingerprint sensor; create second information about at least a region of the second fingerprint image that corresponds to the second light emitting element; and acquire a third fingerprint image by composing an image corresponding to the first information, from the first fingerprint image, and an image corresponding to the second information, from the second fingerprint image.

Figure 18:
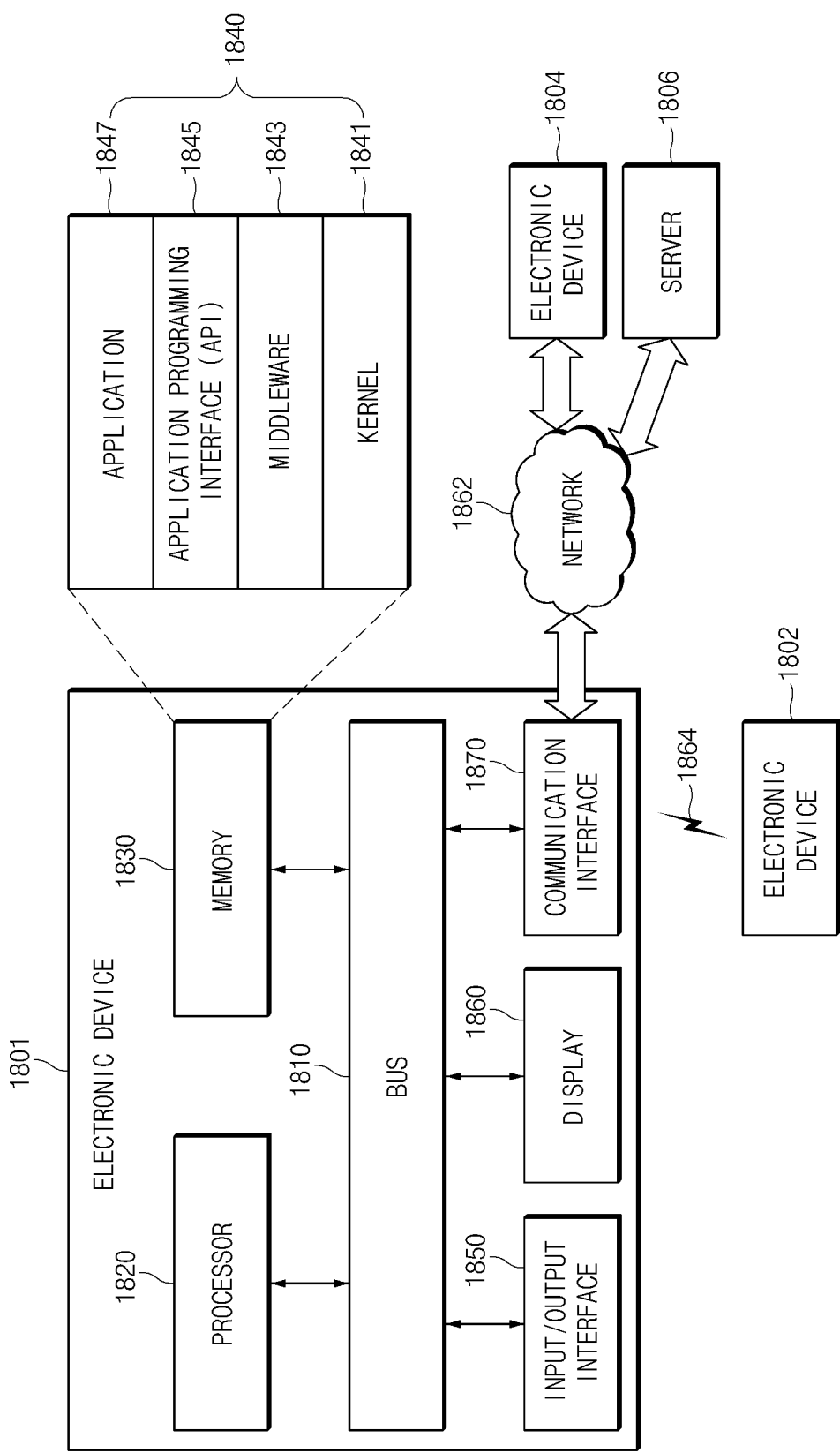
FIG. 18 illustrates an electronic device in a network environment, according to an embodiment of the present disclosure.

FIG. 18 illustrates an electronic device in a network environment.

Referring to FIG. 18 an electronic device 1801, a first electronic device 1802, a second electronic device 1804, and a server 1806 may be connected with each other over a network 1862 or local wireless communication 1864. The electronic device 1801 may include a bus 1810, a processor 1820, a memory 1830, an input/output interface 1850, a display 1860, and a communication interface 1870. The electronic device 1801 may not include at least one of the above described elements or may further include other element(s).

For example, the bus 1810 may interconnect the above described elements 1810 to 1870 and may include a circuit for conveying communications (e.g., a control message and/or data) among the above described elements.

The processor 1820 may include one or more of a CPU, an AP, or a communication processor (CP). For example, the processor 1820 may perform an arithmetic operation or data processing associated with control and/or communication of other elements of the electronic device 1801.

The memory 1830 may include a volatile and/or nonvolatile memory. For example, the memory 1830 may store instructions or data associated with at least one other element(s) of the electronic device 1801. The memory 1830 may store software and/or a program 1840. The program 1840 may include a kernel 1841, a middleware 1843, an application programming interface (API) 1845, and/or an application program (or an application) 1847. At least a part of the kernel 1841, the middleware 1843, or the API 1845 may be referred to as an operating system (OS).

For example, the kernel 1841 may control or manage system resources (e.g., the bus 1810, the processor 1820, the memory 1830, and the like) that are used to execute operations or functions of other programs (e.g., the middleware 1843, the API 1845, and the application program 1847). Furthermore, the kernel 1841 may provide an interface that allows the middleware 1843, the API 1845, or the application program 1847 to access discrete elements of the electronic device 1801 to control or manage system resources.

The middleware 1843 may perform a mediation role such that the API 1845 or the application program 1847 communicates with the kernel 1841 to exchange data.

Furthermore, the middleware 1843 may process one or more task requests received from the application program 1847 according to a task's assigned priority. For example, the middleware 1843 may assign the priority, which makes it possible to use a system resource (e.g., the bus 1810, the processor 1820, the memory 1830, or the like) of the electronic device 1801, to at least one of the application program 1847. For example, the middleware 1843 may process one or more task requests according to the priority assigned which makes it possible to perform scheduling or load balancing of the one or more task requests.

The API 1845 may be an interface through which the application program 1847 controls a function provided by the kernel 1841 or the middleware 1843, and may include, at least one interface or function (e.g., an instruction) for a file control, a window control, image processing, a character control, and the like.

The input/output interface 1850 may play a role, for example, an interface which transmits an instruction or data input from a user or another external device, to other element(s) of the electronic device 1801. Furthermore, the input/output interface 1850 may output an instruction or data, received from other element(s) of the electronic device 1801, to a user or another external device.

The display 1860 may include a liquid crystal display (LCD), a light emitting diode (LED) display, an organic LED (OLED) display, a microelectromechanical systems (MEMS) display, or an electronic paper display. The display 1860 may display various forms of content (e.g., a text, an image, a video, an icon, a symbol, and the like) to a user. The display 1860 may include a touch screen and may receive a touch, a gesture, a proximity, or a hovering input using an electronic pen or a part of a user's body.

The communication interface 1870 may establish communication between the electronic device 1801 and an external device (e.g., the first electronic device 1802, the second electronic device 1804, or the server 1806). For example, the communication interface 1870 may be connected to the network 1862 over wireless communication or wired communication to communicate with the external device.

The wireless communication may use at least one of long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), or the like, as a cellular communication protocol. Furthermore, the wireless communication may include the local wireless communication 1864. The local wireless communication 1864 may include at least one of wireless fidelity (Wi-Fi), Bluetooth™, near field communication (NFC), magnetic secure transmission (MST), GNSS, and the like.

The MST may generate a pulse in response to transmission data using an electromagnetic signal, and the pulse may generate a magnetic field signal. The electronic device 1801 may transfer the magnetic field signal to a POS device, and the POS device may detect the magnetic field signal using an MST reader. The POS device may recover the data by converting the detected magnetic field signal to an electrical signal.

The GNSS may include at least one of a global positioning system (GPS), a global navigation satellite system (Glonass), a Beidou navigation satellite system (Beidou), or a European global satellite-based navigation system (Galileo) based on an available region, a bandwidth, or the like. In the present disclosure, "GPS" and "GNSS" may be interchangeably used. The wired communication may include at least one of a universal serial bus (USB), a high definition multimedia interface (HDMI), a recommended standard 232 (RS-232), a plain old telephone service (POTS), or the like. The network 1862 may include at least one telecommunications network, for example, a computer network (e.g., LAN or WAN), an Internet, or a telephone network.

Each of the first and second electronic devices 1802 and 1804 may be a device of which the type is different from or the same as that of the electronic device 1801. The server 1806 may include a group of one or more servers. All or a portion of operations that the electronic device 1801 performs may be executed by another or a plurality of electronic devices (e.g., the first electronic device 1802, the second electronic device 1804, or the server 1806). In the case where the electronic device 1801 executes any function or service automatically or in response to a request, the electronic device 1801 may not perform the function or the service internally, but, alternatively additionally, it may request at least a portion of a function associated with the electronic device 1801 from other electronic device. The other electronic device may execute the requested function or additional function and may transmit the execution result to the electronic device 1801. The electronic device 1801 may provide the requested function or service using the received result or may perform additional processing on the received result to provide the requested function or service. To this end cloud computing, distributed computing, or client-server computing may be used.

Figure 19:
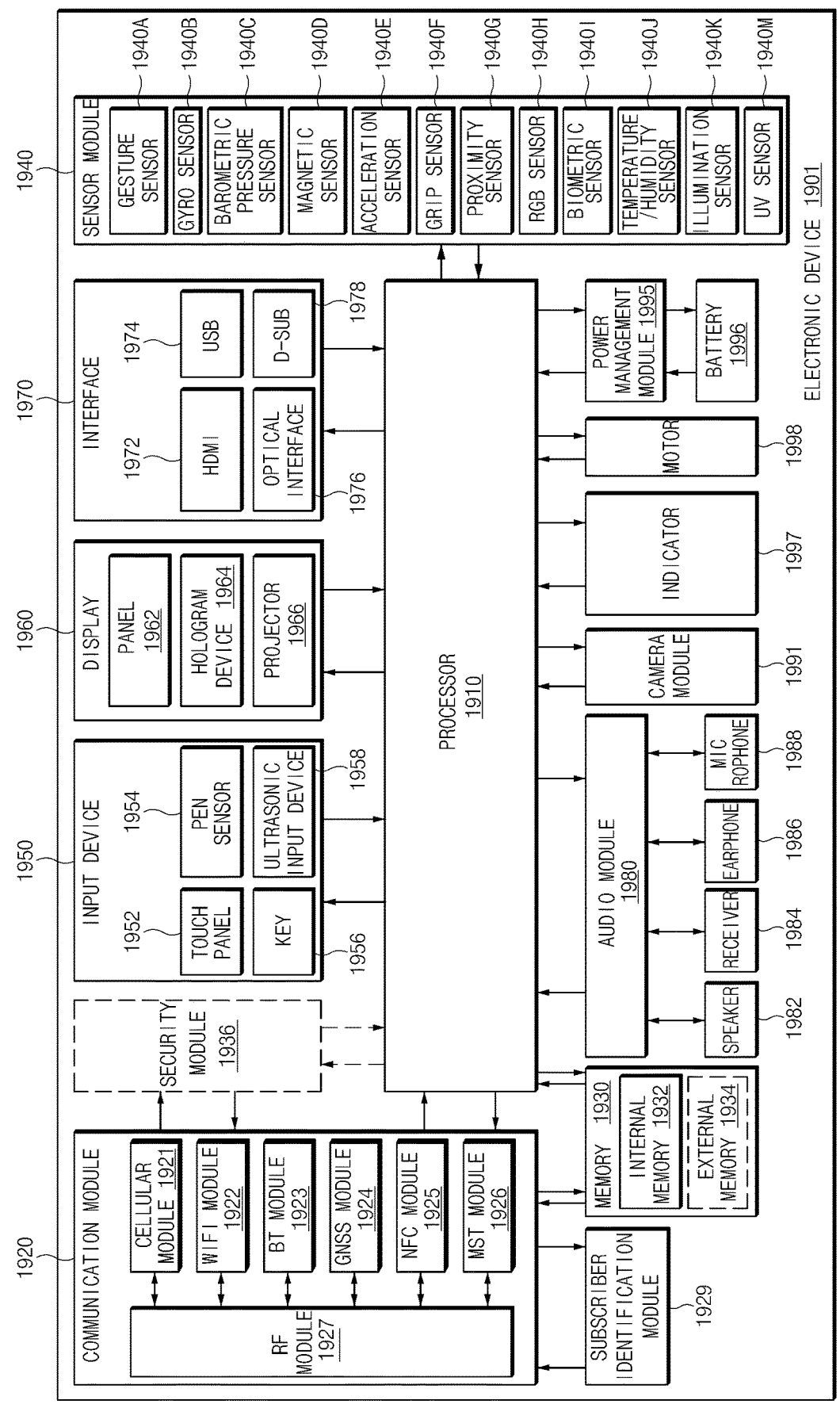
FIG. 19 illustrates a block diagram of an electronic device, according to an embodiment of the present disclosure.

FIG. 19 illustrates a block diagram of an electronic device.

Referring to FIG. 19, an electronic device 1901 may include all or a part of the electronic device 1801 shown in FIG. 18. The electronic device 1901 may include one or more processors (e.g., an AP) 1910, a communication module 1920, a subscriber identification module (SIM) 1929, a memory 1930, a sensor module 1940, an input device 1950, a display 1960, an interface 1970, an audio module 1980, a camera module 1991, a power management module 1995, a battery 1996, an indicator 1997, and a motor 1998.

The processor 1910 may drive an OS or an application to control a plurality of hardware or software elements connected to the processor 1910, and may process and compute a variety of data. The processor 1910 may be implemented with a system on Chip (SoC). The processor 1910 may further include a graphic processing unit (GPU) and/or an image signal processor. The processor 1910 may include at least a part (e.g., a cellular module 1921) of elements shown in FIG. 19. The processor 1910 may load an instruction or data, which is received from at least one of other elements (e.g., a nonvolatile memory), into a volatile memory and process the loaded instruction or data. The processor 1910 may store a variety of data in the nonvolatile memory.

The communication module 1920 may be configured the same as or similar to the communication interface 1870 of FIG. 18. The communication module 1920 may include the cellular module 1921, a Wi-Fi module 1922, a Bluetooth™ (BT) module 1923, a GNSS module 1924 (e.g., a GPS module, a Glonass module, a Beidou module, or a Galileo module), NFC module 1925, an MST module 1926, and a radio frequency (RF) module 1927.

The cellular module 1921 may provide voice communication, video communication, a character service, an Internet service, or the like over a communication network. The cellular module 1921 may perform discrimination and authentication of the electronic device 1901 within a communication network by using the SIM (e.g., a SIM card) 1929. The cellular module 1921 may perform at least a portion of functions that the processor 1910 provides. The cellular module 1921 may include a CP.

Each of the Wi-Fi module 1922, the BT module 1923, the GNSS module 1924, the NFC module 1925, or the MST module 1926 may include a processor for processing data exchanged through a corresponding module. At least a part (e.g., two or more) of the cellular module 1921, the Wi-Fi module 1922, the BT module 1923, the GNSS module 1924, the NFC module 1925, or the MST module 1926 may be included within one Integrated Circuit (IC) or an IC package.

The RF module 1927 may transmit and receive a communication signal (e.g., an RF signal). The RF module 1927 may include a transceiver, a power amplifier module (PAM), a frequency filter, a low noise amplifier (LNA), an antenna, or the like. At least one of the cellular module 1921, the Wi-Fi module 1922, the BT module 1923, the GNSS module 1924, the NFC module 1925, or the MST module 1926 may transmit and receive an RF signal through a separate RF module.

The SIM 1929 may include a card and/or embedded SIM that includes a SIM and may include unique identify information (e.g., integrated circuit card identifier (ICCID)) or subscriber information (e.g., international mobile subscriber identity (IMSI)).

The memory 1930 (e.g., the memory 1830) may include an internal memory 1932 or an external memory 1934. The internal memory 1932 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1934 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1934 may be operatively and/or physically connected to the electronic device 1901 through various interfaces.

A security module 1936 may be a module that includes a storage space of which a security level is higher than that of the memory 1930 and may be a circuit that guarantees safe data storage and a protected execution environment. The security module 1936 may be implemented with a separate circuit and may include a separate processor. For example, the security module 1936 may be in a smart chip or a SD card, which is removable, or may include an embedded secure element (eSE) embedded in a fixed chip of the electronic device 1901. Furthermore, the security module 1936 may operate based on an OS that is different from the OS of the electronic device 1901. For example, the security module 1936 may operate based on java card open platform (JCOP) OS.

The sensor module 1940 may measure a physical quantity or may detect an operation state of the electronic device 1901. The sensor module 1940 may convert the measured or detected information to an electric signal. The sensor module 1940 may include at least one of a gesture sensor 1940A, a gyro sensor 1940B, a barometric pressure sensor 1940C, a magnetic sensor 1940D, an acceleration sensor 1940E, a grip sensor 1940F, the proximity sensor 1940G, a color sensor 1940H (e.g., red, green, blue (RGB) sensor), a biometric sensor 1940I, a temperature/humidity sensor 1940J, an illuminance sensor 1940K, or an UV sensor 1940M. The sensor module 1940 may further include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1940 may further include a control circuit for controlling at least one or more sensors included therein. The electronic device 1901 may further include a processor that is a part of the processor 1910 or independent of the processor 1910, and is configured to control the sensor module 1940. The processor may control the sensor module 1940 while the processor 1910 remains in a sleep state.

The input device 1950 may include a touch panel 1952, a (digital) pen sensor 1954, a key 1956, or an ultrasonic input unit 1958. The touch panel 1952 may use at least one of capacitive, resistive, infrared, and ultrasonic detecting methods. Also, the touch panel 1952 may further include a control circuit. The touch panel 1952 may further include a tactile layer to provide a tactile reaction to a user.

The (digital) pen sensor 1954 may be a part of a touch panel or may include an additional sheet for recognition. The key 1956 may include a physical button, an optical key, or a keypad. The ultrasonic input device 1958 may detect (or sense) an ultrasonic signal, which is generated from an input device, through a microphone 1988 and may check data corresponding to the detected ultrasonic signal.

The display 1960 (e.g., the display 1860) may include a panel 1962, a hologram device 1964, or a projector 1966. The panel 1962 may be the same as or similar to the display 1860 shown in FIG. 18. The panel 1962 may be implemented to be flexible, transparent, or wearable. The panel 1962 and the touch panel 1952 may be integrated into a single module. The panel 1962 may include a pressure sensor (or force sensor) that measures the intensity of touch pressure by a user. The pressure sensor may be integrated with the touch panel 1952, or may be implemented as at least one sensor separately from the touch panel 1952. The hologram device 1964 may display a stereoscopic image in a space using a light interference phenomenon. The projector 1966 may project light onto a screen to display an image. The screen may be arranged in the inside or the outside of the electronic device 1901. The display 1960 may further include a control circuit for controlling the panel 1962, the hologram device 1964, or the projector 1966.

The interface 1970 may include a high-definition multimedia interface (HDMI) 1972, a universal serial bus (USB) 1974, an optical interface 1976, or a D-subminiature (D-sub) 1978. The interface 1970 may be included in the communication interface 1870 shown in FIG. 18. Additionally or generally, the interface 1970 may include a mobile high definition link (MHL) interface, a SD card/multi-media card (MMC) interface, or an Infrared Data Association (IrDA) standard interface.

The audio module 1980 may convert a sound and an electric signal in dual directions. At least a part of the audio module 1980 may be included in the input/output interface 1850 shown in FIG. 18. The audio module 1980 may process sound information that is input or output through a speaker 1982, a receiver 1984, an earphone 1986, or the microphone 1988.

The camera module 1991 may shoot a still image or a video. The camera module 1991 may include at least one or more image sensors (e.g., a front sensor or a rear sensor), a lens, an image signal processor (ISP), or a flash (e.g., an LED or a xenon lamp).

The power management module 1995 may manage power of the electronic device 1901. A power management integrated circuit (PMIC), a charger IC, or a battery gauge may be included in the power management module 1995. The PMIC may have a wired charging method and/or a wireless charging method. The wireless charging method may include a magnetic resonance method, a magnetic induction method, or an electromagnetic method, and may further include an additional circuit, for example, a coil loop, a resonant circuit, a rectifier, or the like. The battery gauge may measure a remaining capacity of the battery 1996 and a voltage, current, or temperature thereof while the battery is charged. The battery 1996 may include a rechargeable battery and/or a solar battery.

The indicator 1997 may display a specific state of the electronic device 1901 or a part thereof (e.g., the processor 1910), such as a booting state, a message state, a charging state, and the like. The motor 1998 may convert an electrical signal into a mechanical vibration and may generate the following effects: vibration, haptic, and the like. A processing device (e.g., a GPU) for supporting a mobile TV may be included in the electronic device 1901. The processing device for supporting the mobile TV may process media data according to the standards of digital multimedia broadcasting (DMB), digital video broadcasting (DVB), MediaFLO™, or the like.

Each of the above mentioned elements of the electronic device may be configured with one or more components, and the names of the elements may be changed according to the type of the electronic device. The electronic device may include at least one of the above mentioned elements, and some elements may be omitted or other additional elements may be added. Furthermore, some of the elements of the electronic device may be combined with each other to form one entity, so that the functions of the elements may be performed in the same manner as before the combination.

Figure 20:
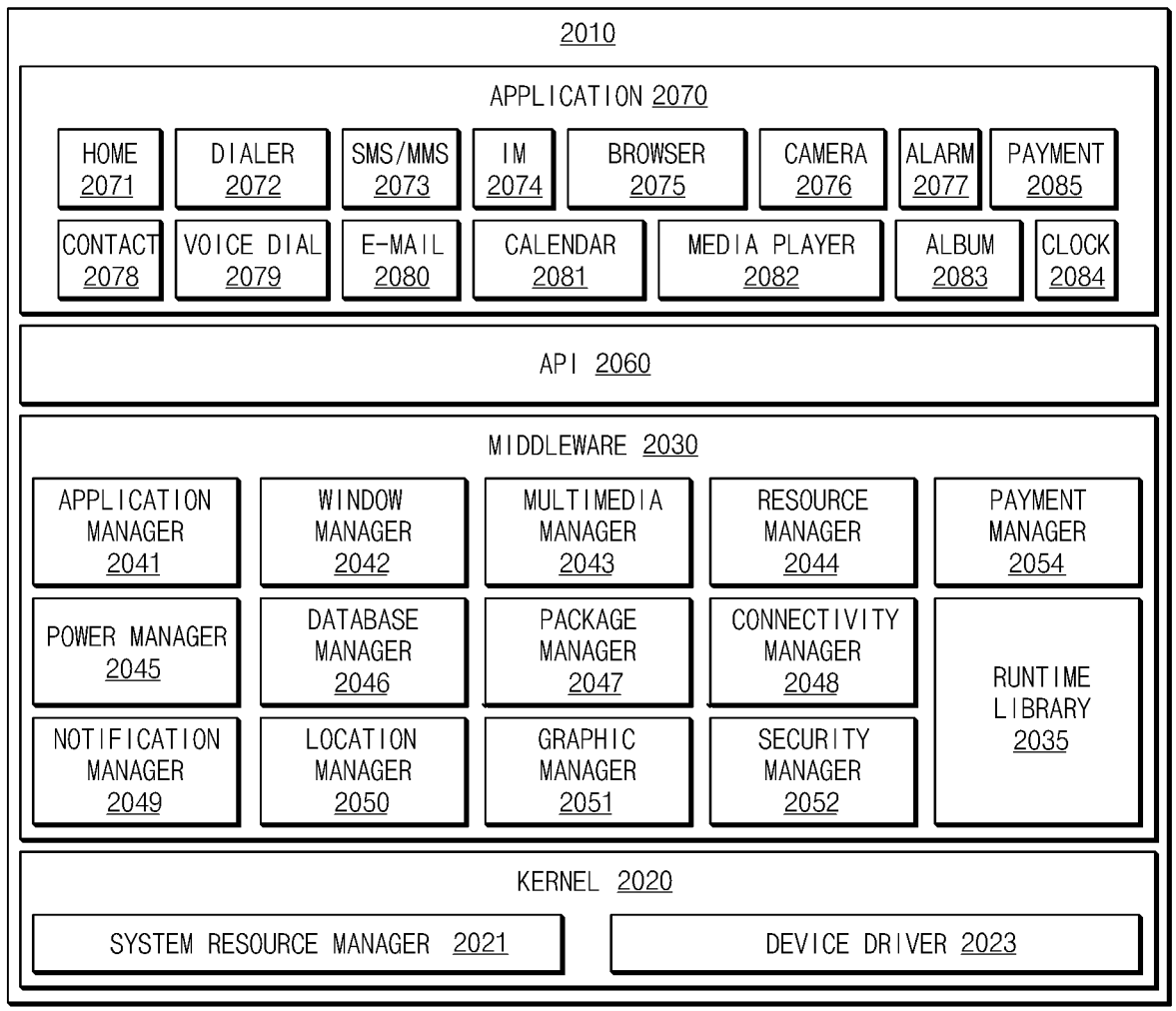
FIG. 20 illustrates a block diagram of a program module, according to embodiments of the present disclosure.

FIG. 20 shows a block diagram of a program module.

A program module 2010 may include an OS to control resources associated with an electronic device 1801, and/or applications. The OS may be Android™, iOS™ Windows™, Symbian™, Tizen™, or Bada™.

The program module 2010 may include a kernel 2020, a middleware 2030, an API 2060, and/or an application 2070. At least a portion of the program module 2010 may be preloaded on an electronic device or may be downloadable from an external electronic device (e.g., the first electronic device 1802, the second electronic device 1804, the server 1806, or the like).

The kernel 2020 may include a system resource manager 2021 or a device driver 2023. The system resource manager 2021 may control, allocate, or retrieve system resources. The system resource manager 2021 may include a process managing unit, a memory managing unit, a file system managing unit, or the like. The device driver 2023 may include a display driver, a camera driver, a Bluetooth™ driver, a shared memory driver, a USB driver, a keypad driver, a Wi-Fi driver, an audio driver, or an inter-process communication (IPC) driver.

The middleware 2030 may provide a function that the application 2070 needs in common, or may provide functions to the application 2070 through the API 2060 to allow the application 2070 to efficiently use the limited system resources of the electronic device. The middleware 2030 may include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, a security manager 2052, or a payment manager 2054.

The runtime library 2035 may include a library module that is used by a compiler to add a new function through a programming language while the application 2070 is being executed. The runtime library 2035 may perform input/output management, memory management, or capacities about arithmetic functions.

The application manager 2041 may manage a life cycle of at least one application of the application 2070. The window manager 2042 may manage a graphic user interface (GUI) resource. The multimedia manager 2043 may identify a format necessary for playing media files, and may perform encoding or decoding of media files by using a codec suitable for the format. The resource manager 2044 may manage resources such as a storage space, memory, or source code of at least one application of the application 2070.

The power manager 2045 may operate with a basic input/output system (BIOS) to manage a battery or power, and may provide power information about the electronic device. The database manager 2046 may generate, search for, or modify database that can be used in at least one application of the application 2070. The package manager 2047 may install or update an application that is distributed in the form of package file.

The connectivity manager 2048 may manage a wireless connection such as Wi-Fi or Bluetooth™. The notification manager 2049 may display or notify an event such as an arrival message, an appointment, or a proximity notification to a user. The location manager 2050 may manage location information about an electronic device. The graphic manager 2051 may manage a graphic effect that is provided to a user, or manage a user interface relevant thereto. The security manager 2052 may provide a general security function necessary for system security, user authentication, or the like. In the case where an electronic device 1801 includes a telephony function, the middleware 2030 may further include a telephony manager for managing a voice or video call function of the electronic device.

The middleware 2030 may include a middleware module that combines functions of the above described elements. The middleware 2030 may provide a module specialized to each version of OS to provide differentiated functions. Additionally, the middleware 2030 may dynamically remove a part of the preexisting elements or may add new elements thereto.

The API 2060 may be a set of programming functions and may be provided with a configuration that is depending on an OS. For example, in the case where an OS is the Android™ or the iOS™, it may provide one API set per platform. In the case where an OS is the Tizen™, it may provide two or more API sets per platform.

The application 2070 may include one or more applications capable of providing functions for a home 2071, a dialer 2072, an SMS/MMS 2073, an instant message (IM) 2074, a browser 2075, a camera 2076, an alarm 2077, a contact 2078, a voice dial 2079, an e-mail 2080, a calendar 2081, a media player 2082, an album 2083, a timepiece 2084, a payment 2085, health care (e.g., measuring an exercise quantity, blood sugar level, or the like), or offering of environment information (e.g., information of barometric pressure, humidity, temperature, or the like).

The application 2070 may include an information exchanging application to support information exchange between an electronic device 1801 and an external electronic device (e.g., the first electronic device 1802, or the second electronic device 1804). The information exchanging application may include a notification relay application for transmitting specific information to an external electronic device, or a device management application for managing the external electronic device.

The notification relay application may include a function for transmitting notification information, which arise from other applications (e.g., applications for SMS/MMS, e-mail, health care, or environmental information), to an external electronic device. Additionally, the notification relay application may receive notification information from an external electronic device and provide the notification information to a user.

The device management application may manage (e.g., install, delete, or update) at least one function (e.g., turn on/turn off of an external electronic device itself (or a part of components), or adjustment of brightness (or resolution) of a display) of the external electronic device which communicates with the electronic device, an application running in the external electronic device, or a service (e.g., a call service, a message service, or the like) provided from the external electronic device.

The application 2070 may include an application (e.g., a health care application for a mobile medical device) that is assigned in accordance with an attribute of an external electronic device. The application 2070 may include an application that is received from an external electronic device. The application 2070 may include a preloaded application or a third party application that is downloadable from a server. The names of elements of the program module 2010 may be modifiable depending on the kind of OS installed on the electronic device.

At least a portion of the program module 2010 may be implemented by software, firmware, hardware, or a combination of two or more thereof. At least a portion of the program module 2010 may be implemented (e.g., executed) by the processor. At least a portion of the program module 2010 may include modules, programs, routines, sets of instructions, processes, or the like for performing one or more functions.

The term "module" used in the present disclosure may represent a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. The "module" may include at least one of an application specific IC (ASIC) chip, a field programmable gate array (FPGA), and a programmable logic device for performing some operations, which are known or will be developed.

At least a part of an apparatus (e.g., modules or functions thereof) or a method (e.g., operations) may be implemented by instructions stored in computer readable storage media in the form of a program module. The instruction, when executed by a processor, may cause the one or more processors to perform a function corresponding to the instruction. The computer readable storage media may be the memory 1830.

A computer readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only assembly code such as things generated by a compiler but also a high-level language code executable on a computer using an interpreter. The above hardware unit may be configured to operate via one or more software modules for performing an operation, and vice versa.

A storage medium may be provided that has instructions stored therein. The instructions may be set to cause at least one processor to perform at least one operation when the instructions are executed by the at least one processor, in which the at least one operation may include emitting light by a display panel in an electronic device; receiving the emitted light through a first guide structure and a second guide structure; and acquiring fingerprint information based on the received light.

A storage medium may be provided that has instructions stored therein. The instructions may be set to cause at least one processor to perform at least one operation when the instructions are executed by the at least one processor, in which the at least one operation may include turning on pixels arranged in a first region in an electronic device; turning off a light receiving unit corresponding to the first region; acquiring a first fingerprint information by using light emitted from the pixels arranged in the first region; turning off the pixels arranged in the first region; setting a second region; turning on pixels arranged in the second region; turning off a light receiving unit corresponding to the second region; acquiring a second fingerprint information by using light emitted from the pixels arranged in the second region; and turning off the pixels arranged in the second region.

A module or a program module may include at least one of the above elements, or a part of the above elements may be omitted, or additional elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

Embodiments of the present disclosure are provided merely to easily describe technical details of the present disclosure and to help the understanding of the present disclosure, and are not intended to limit the scope of the present disclosure. Therefore, it should be construed that all modifications and changes or various other embodiments of the present disclosure based on the technical idea of the present disclosure fall within the scope of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a cover glass forming an outer surface of the electronic device;
   a first guide structure disposed below the cover glass and transmitting light polarized in a specified direction;
   a display panel disposed below the first guide structure and including a plurality of pixels;
   a second guide structure disposed below the display panel and transmitting light polarized in the specified direction;
   a fingerprint sensor disposed below the second guide structure; and
   an opaque member disposed below the display panel and blocking at least a portion of light emitted from the display panel and directly input to the fingerprint sensor,
   wherein the opaque member includes an opening in an area corresponding to the fingerprint sensor.

2. The electronic device of claim 1, further comprising:
   a protective layer disposed below the display panel,
   wherein the second guide structure is disposed at the protective layer.

3. The electronic device of claim 2, wherein the protective layer includes at least one of an embo, a sponge, and a copper (Cu) graphite coating layer.

4. The electronic device of claim 1, wherein the fingerprint sensor acquires a user's fingerprint information using light having passed through the first and second guide structures, from reflected light reflected by the user's finger making contact with the cover glass after being emitted from the display panel.

5. The electronic device of claim 4, wherein the fingerprint sensor acquires noise distribution that represents the degree to which light other than the reflected light reaches the fingerprint sensor and subtracts the noise distribution from the fingerprint information.

6. The electronic device of claim 1, wherein each of the plurality of pixels includes a first sub-pixel, a second sub-pixel, and opaque electrodes disposed below the respective first and second sub-pixels,
   wherein the second guide structure is disposed below the first sub-pixel, and
   wherein if the first sub-pixel is turned off and the second sub-pixel is turned on, the fingerprint sensor acquires a user's fingerprint information using light having passed through the first and second guide structures, from reflected light reflected by a user's finger making contact with the cover glass after being emitted from the second sub-pixel.

7. The electronic device of claim 1, further comprising:
   an optical guide refracting at least a portion of light emitted from the plurality of pixels and refracting light reflected by a finger making contact with the cover glass from the refracted light.

8. The electronic device of claim 7, wherein the optical guide is disposed in a semi-circular form on a surface of the cover glass, and
   wherein the optical guide has a refractive index corresponding to a refractive index of the cover glass.

9. The electronic device of claim 7, wherein the optical guide is disposed in a circular form on a surface of the cover glass, and
   wherein the optical guide has a refractive index greater than a refractive index of the cover glass.

10. The electronic device of claim 7, wherein the optical guide includes a pattern having a preset shape on a surface of the optical guide.

11. The electronic device of claim 7, wherein the optical guide is transformed from a liquid layer into a lens having a preset shape if a voltage is applied to the optical guide.

12. The electronic device of claim 1, wherein the cover glass includes a hole formed through the cover glass, and
    wherein the hole refracts at least a portion of light emitted from the plurality of pixels and refracts light reflected by a finger making contact with the cover glass from the refracted light.

13. The electronic device of claim 1, further comprising:
    a photo-chromic layer disposed over the fingerprint sensor and having a hole in an area corresponding to the fingerprint sensor,
    wherein the photo-chromic layer changes color if a current is applied to the photo-chromic layer, and the photo-chromic layer blocks out external light input to the fingerprint sensor from outside the electronic device.

14. The electronic device of claim 1, further comprising:
    a filter disposed over the fingerprint sensor and transmitting light in a visible wavelength range.

15. An electronic device comprising:
    a cover glass forming an outer surface of the electronic device;
    a first guide structure disposed below the cover glass and transmitting light polarized in a specified direction;
    a display panel disposed below the first guide structure and including a plurality of pixels; and
    an opaque member disposed below the display panel and blocking at least a portion of light emitted from the display panel and directly input to a fingerprint sensor,
    wherein the display panel includes a second guide structure transmitting light polarized in the specified direction and a pixel layer disposed below the second guide structure and including the plurality of pixels,
    wherein the opaque member includes an opening in an area corresponding to the fingerprint sensor disposed below the second guide structure, and
    wherein each of the plurality of pixels includes a plurality of sub-pixels and the fingerprint sensor.

16. The electronic device of claim 15, wherein the fingerprint sensor acquires a user's fingerprint information using light having passed through the first and second guide structures, from light reflected by a user's finger making contact with the cover glass after being emitted from the plurality of pixels.

17. The electronic device of claim 15, further comprising:
an optical guide refracting at least a portion of light emitted from the plurality of pixels and refracting light reflected by a finger making contact with the cover glass from the refracted light.

18. The electronic device of claim 15, further comprising:
a photo-chromic layer disposed over the fingerprint sensor and having a hole in an area corresponding to the fingerprint sensor,
wherein the photo-chromic layer changes color if a current is applied to the photo-chromic layer, and the photo-chromic layer blocks out external light input to the fingerprint sensor from outside the electronic device.

19. An electronic device comprising:

a cover glass forming an outer surface of the electronic device;

a first guide structure disposed below the cover glass and transmitting light polarized in a specified direction;

a display panel disposed below the first guide structure and including a plurality of pixels and a second guide structure transmitting light polarized in the specified direction;

a fingerprint sensor disposed below the display panel; and an opaque member disposed below the display panel and blocking at least a portion of light emitted from the display panel and directly input to the fingerprint sensor, wherein the opaque member includes an opening in an area corresponding to the fingerprint sensor.

* * * * *